(12) United States Patent
Yoshioka

(10) Patent No.: US 7,757,480 B2
(45) Date of Patent: Jul. 20, 2010

(54) AIR-FUEL RATIO CONTROL APPARATUS OF INTERNAL COMBUSTION ENGINE

(75) Inventor: Mamoru Yoshioka, Susono (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 964 days.

(21) Appl. No.: 11/525,171

(22) Filed: Sep. 22, 2006

(65) Prior Publication Data

US 2007/0012033 A1 Jan. 18, 2007

Related U.S. Application Data

(62) Division of application No. 11/002,489, filed on Dec. 3, 2004, now Pat. No. 7,222,482.

(30) Foreign Application Priority Data

Dec. 5, 2003 (JP) .............................. 2003-407449

(51) Int. Cl.
*F01N 3/00* (2006.01)

(52) U.S. Cl. .............................. 60/289; 60/285; 60/287; 60/293; 60/298

(58) Field of Classification Search .................... 60/277, 60/285, 299
See application file for complete search history.

(56) References Cited

U.S. PATENT DOCUMENTS 5,724,809 A * 3/1998 Mitsutani et al. .............. 60/276

6,405,527 B2 * 6/2002 Suzuki et al. .................. 60/285
2002/0144500 A1 * 10/2002 Nakata .......................... 60/277

FOREIGN PATENT DOCUMENTS

| JP | A 59-173533 | 10/1984 |
| JP | A 63-117139 | 5/1988 |
| JP | A 63-134835 | 7/1988 |
| JP | A 02-188616 | 7/1990 |
| JP | A 06-307271 | 11/1994 |
| JP | A-2000-87736 | 3/2000 |
| JP | A-2000-120428 | 4/2000 |
| JP | A-2002-371836 | 12/2002 |
| JP | A-2003-343322 | 12/2003 |

* cited by examiner

*Primary Examiner*—Thomas E Denion
*Assistant Examiner*—Jesse Bogue
(74) *Attorney, Agent, or Firm*—Oliff & Berridge PLC

(57) ABSTRACT

An air-fuel ratio control apparatus of an internal combustion engine includes: an exhaust gas purifying catalyst disposed in an exhaust passage of the internal combustion engine; fuel cutting means for cutting fuel to be supplied to the internal combustion engine at the time of deceleration of the internal combustion engine; and catalyst degradation suppressing means for suppressing degradation of the exhaust gas purifying catalyst by prohibiting operation of the fuel cutting means when it is determined that the degradation of the exhaust gas purifying catalyst advances, wherein the catalyst degradation suppressing means sets an operation permitting period, during which the operation of the fuel cutting means is permitted after completion of a fuel quantity increasing operation of the internal combustion engine.

2 Claims, 16 Drawing Sheets

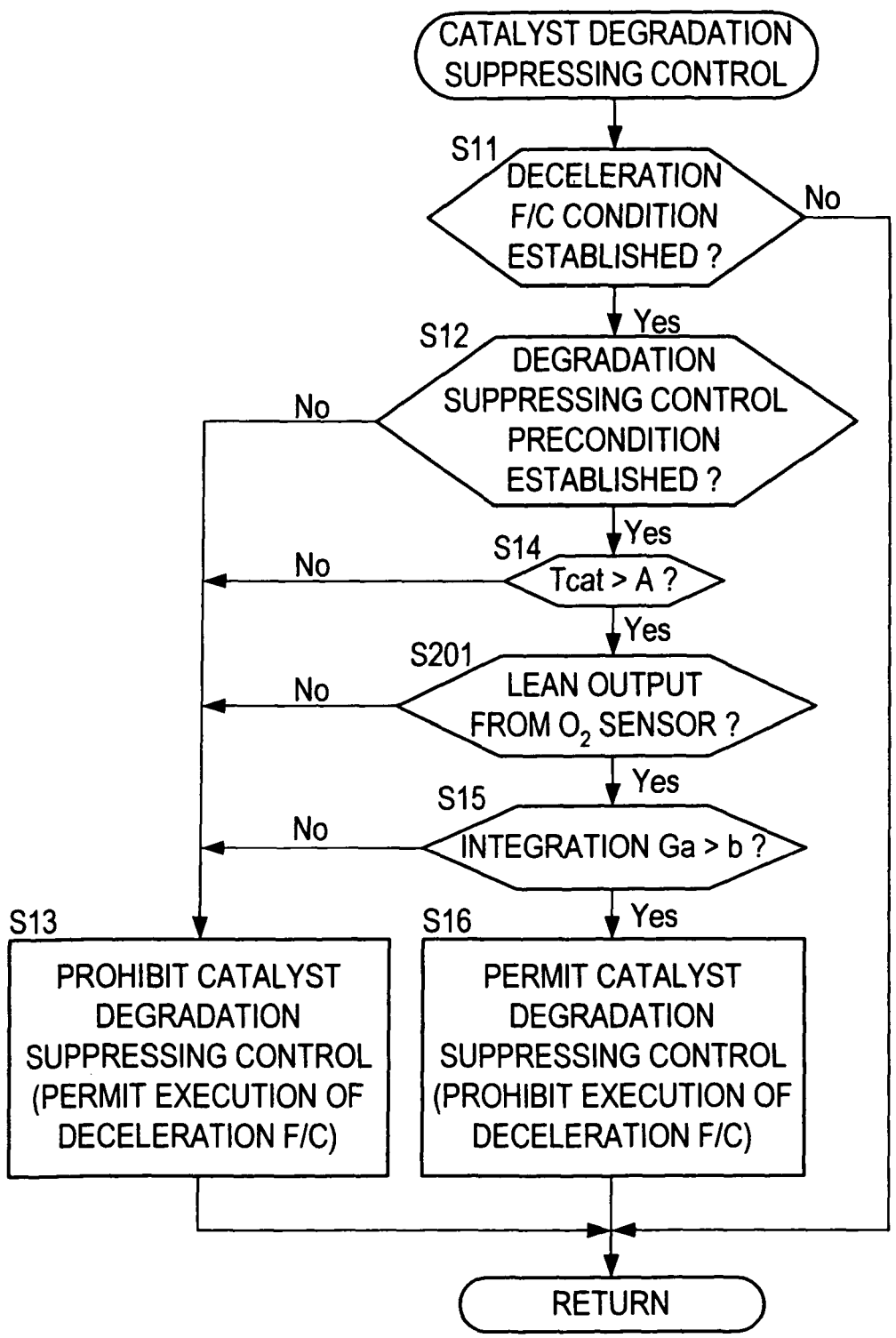

AIR-FUEL RATIO CONTROL APPARATUS OF INTERNAL COMBUSTION ENGINE

This is a Divisional of application Ser. No. 11/002,489 filed on Dec. 3, 2004. This application claims the benefit of Japanese Patent Application No. 2003-407449, filed Dec. 5, 2003. The entire disclosures of the prior applications are hereby incorporated by reference herein in their entirety.

BACKGROUND OF THE INVENTION

The present invention relates to an air-fuel ratio control apparatus of an internal combustion engine.

There has been conventionally known an air-fuel ratio control apparatus of an internal combustion engine in which when fuel is increased in quantity in the internal combustion engine and an output from an oxygen concentration sensor, which is disposed downstream from a catalyst converter, is rich, an air-fuel ratio is controlled to be a lean air-fuel ratio for a predetermined period of time, and thereafter, the air-fuel ratio is controlled to be returned to a theoretical air-fuel ratio (see Japanese Patent Application Laid-Open (JP-A) No. S63-117139). In addition, the prior art relevant to the present invention is disclosed in Patent JP-A Nos. S63-134835, H6-307271, S59-173533, and H2-188616.

The capacity of a catalyst in an exhaust gas purifying system mounted on a vehicle or the like has been increased in order to cope with the reinforcement of emission control. Therefore, there is a possibility that a conventional air-fuel ratio control cannot suppress generation of a catalyst exhaust gas odor (specifically, an odor of hydrogen sulfide ($H_2S$)) after fuel quantity increasing operation of the internal combustion engine, because a quantity of oxygen occluded in an exhaust gas purifying catalyst is small till deceleration or stoppage of the vehicle. In order to occlude the oxygen in quantity enough to suppress the generation of the catalyst exhaust gas odor with respect to the catalyst till the deceleration or stoppage of the internal combustion engine, for example, the air-fuel ratio is largely changed onto a lean side by cutting the fuel or the internal combustion engine is operated in a lean air-fuel ratio for a long period of time. However, there may be a problem of a miss fire in the internal combustion engine when the air-fuel ratio is largely changed onto the lean side, while there may be a problem of degradation of exhaust emission due to an increase in $NO_x$ generation quantity during operation in a lean air-fuel ratio for a long period of time. Additionally, the degradation of the catalyst is intensified in the atmosphere in which the oxygen is excessively present at a high temperature.

SUMMARY OF THE INVENTION

In view of the above-described problems, an object of the present invention is to provide an air-fuel ratio control apparatus of an internal combustion engine, in which oxygen in quantity capable of suppressing generation of a catalyst exhaust gas odor till the deceleration or stoppage of the internal combustion engine can be securely occluded in an exhaust gas purifying catalyst while suppressing degradation of the exhaust gas purifying catalyst.

In the first aspect of the present invention, there is provided an air-fuel ratio control apparatus of an internal combustion engine comprising: an exhaust gas purifying catalyst disposed in an exhaust passage of the internal combustion engine; fuel cutting means for cutting fuel to be supplied to the internal combustion engine at the time of deceleration of the internal combustion engine; and catalyst degradation suppressing means for suppressing degradation of the exhaust gas purifying catalyst by prohibiting operation of the fuel cutting means when it is determined that the degradation of the exhaust gas purifying catalyst advances, wherein the catalyst degradation suppressing means sets an operation permitting period, during which the operation of the fuel cutting means is permitted after completion of a fuel quantity increasing operation of the internal combustion engine.

According to the air-fuel ratio control apparatus of the first aspect according to the present invention, the catalyst degradation suppressing means sets the operation permitting period of the fuel cutting means after the fuel quantity increasing operation of the internal combustion engine, so that the fuel is cut so as to make the air-fuel ratio of the exhaust gas lean at the time of the deceleration of the internal combustion engine. Consequently, it is possible to supply oxygen to the exhaust gas purifying catalyst in the reduced oxygen occlusion quantity by the fuel quantity increasing operation, thus occluding the oxygen in the exhaust gas purifying catalyst till the stoppage of the internal combustion engine.

In the first aspect of the air-fuel ratio control apparatus according to the present invention, the catalyst degradation suppressing means may determine a completion timing of the operation permitting period based on an integration quantity of intake air taken into the internal combustion engine after the completion of the fuel quantity increasing operation, or the catalyst degradation suppressing means may determine a completion timing of the operation permitting period based on a lapse of time after the completion of the fuel quantity increasing operation. The quantity of oxygen occluded in the exhaust gas purifying catalyst can be estimated based on the integrating air intake quantity or the lapse of time after the fuel quantity increasing operation. Thus, it is possible to shorten the period, during which the atmosphere of the exhaust gas purifying catalyst becomes lean, so as to suppress the degradation of the exhaust gas purifying catalyst by completing the operation permitting period based on the integrating air intake quantity or the lapse of time after the fuel quantity increasing operation in the above-described manner.

Furthermore, in the first aspect of the air-fuel ratio control apparatus according to the present invention, the catalyst degradation suppressing means may determine a completion timing of the operation permitting period based on an integration quantity of intake air taken into the internal combustion engine after an air-fuel ratio of exhaust gas flowing into the exhaust gas purifying catalyst is changed to a lean air-fuel ratio, or the catalyst degradation suppressing means may determine a completion timing of the operation permitting period based on a lapse of time after an air-fuel ratio of exhaust gas flowing into the exhaust gas purifying catalyst is changed to a lean air-fuel ratio. Since no oxygen flows into the exhaust gas purifying catalyst when the air-fuel ratio is not lean even after the fuel quantity increasing operation, no oxygen is occluded in the exhaust gas purifying catalyst. Thus, it is possible to more accurately determine whether the oxygen in quantity enough to suppress a catalyst exhaust gas odor is occluded in the exhaust gas purifying catalyst by determining the completion timing based on the integrating air intake quantity or the lapse of time after the air-fuel ratio of the exhaust gas flowing to the exhaust gas purifying catalyst is changed to a lean air-fuel ratio in the above-described manner.

The air-fuel ratio control apparatus of the first aspect according to the present invention may further comprise air-fuel ratio controlling means for controlling an air-fuel ratio in the internal combustion engine, and the air-fuel ratio controlling means may set a lean control period, during which the air-fuel ratio is controlled to be a lean air-fuel ratio only at the deceleration of the internal combustion engine, after the completion of the fuel quantity increasing operation. In this case, the air-fuel ratio is not controlled to be the lean air-fuel ratio except for the time of the deceleration of the internal combustion engine, and the degradation of the exhaust gas purifying catalyst can be suppressed. In contrast, since the air-fuel ratio is controlled to be the lean air-fuel ratio at the time of the deceleration of the internal combustion engine, the oxygen is supplied during the deceleration, so that the oxygen can be occluded in the exhaust gas purifying catalyst till the stoppage of the internal combustion engine.

After the oxygen in quantity enough to suppress the catalyst exhaust gas odor is occluded in the exhaust gas purifying catalyst, the degradation of the exhaust gas purifying catalyst can further be suppressed unless the air-fuel ratio is controlled to be the lean air-fuel ratio even at the time of the deceleration of the internal combustion engine. Thus, in the first aspect of the air-fuel ratio control aspect according to the present invention, the air-fuel ratio controlling means may determine a completion timing of the lean control period based on an integration quantity of intake air taken into the internal combustion engine after the completion of the fuel quantity increasing operation, or the air-fuel ratio controlling means may determine a completion timing of the lean control period based on a lapse of time after the completion of the fuel quantity increasing operation.

Moreover, the air-fuel ratio controlling means may determine a completion timing of the lean control period based on an integration quantity of intake air taken into the internal combustion engine after an air-fuel ratio of exhaust gas flowing into the exhaust gas purifying catalyst is changed to a lean air-fuel ratio, or the air-fuel ratio controlling means may determine a completion timing of the lean control period based on a lapse of time after an air-fuel ratio of exhaust gas flowing into the exhaust gas purifying catalyst is changed to a lean air-fuel ratio. Thus, it is possible to more accurately estimate an oxygen occlusion quantity in the exhaust gas purifying catalyst by the determining the completion timing in the above-described manner.

In the first aspect of the air-fuel ratio control apparatus according to the present invention, the air-fuel ratio controlling means may set the lean control period to be shorter as a stoichiometric operation period, during which the internal combustion engine is operated in a stoichiometric air-fuel ratio after the fuel quantity increasing operation of the internal combustion engine, is longer. The oxygen is contained also in the exhaust gas to be exhausted during the stoichiometric operation of the internal combustion engine. Therefore, the oxygen is gradually occluded in the exhaust gas purifying catalyst also when the internal combustion engine is stoichiometrically operated. Consequently, when the period of the stoichiometric operation after the fuel quantity increasing operation is long, the lean control period can be shortened. Thus, it is possible to suppress the degradation of the exhaust gas purifying catalyst.

In the first aspect of the air-fuel ratio control apparatus according to the present invention, the air-fuel ratio controlling means may set the lean control period when a fuel cutting period, during which the fuel cutting means cuts the fuel, is shorter than a predetermined value, after the fuel quantity increasing operation of the internal combustion engine. During the fuel cutting period, the concentration of the oxygen in the exhaust gas is substantially equal to that of the air, so that much oxygen can be occluded in the exhaust gas purifying catalyst. However, when the fuel cutting period is short, there is a possibility that the oxygen in quantity enough to suppress the catalyst exhaust gas odor is not occluded in the exhaust gas purifying catalyst. Thus, the oxygen can be sufficiently occluded in the exhaust gas purifying catalyst by setting the lean control period when it is determined that the fuel cutting period is short.

The air-fuel ratio control apparatus of the first aspect according to the present invention may further comprises oxygen integration flow rate acquiring means for acquiring an integration flow rate of oxygen flowing into the exhaust gas purifying catalyst, and the air-fuel ratio controlling means may set the lean control period when the oxygen integration flow rate acquired by the oxygen integration flow rate acquiring means during the fuel cutting period is lower than a predetermined quantity. Thus, it can be more properly determined whether the lean control period is set based on the integration flow rate of the oxygen flowing into the exhaust gas purifying catalyst during the fuel cutting period in the above-described manner.

In the second aspect of the present invention, there is provided air-fuel ratio control apparatus of an internal combustion engine comprising: a plurality of exhaust gas purifying catalysts disposed in an exhaust passage of the internal combustion engine; secondary air supplying means for supplying secondary air to at least one portion between the plurality of exhaust gas purifying catalysts through a secondary air passage; valve means for switching connection to or disconnection from the secondary air passage; valve controlling means for controlling operation of the valve means; and fuel cutting means for cutting fuel to be supplied to the internal combustion engine at the time of deceleration of the internal combustion engine, wherein the valve controlling means sets a supplying period, during which the secondary air is supplied by switching the valve means to a connection state during a non-operating period of the fuel cutting means after completion of a fuel quantity increasing operation of the internal combustion engine.

According to the air-fuel ratio control apparatus of the second aspect according to the present invention, the secondary air is supplied by the valve controlling means after the fuel quantity increasing operation, so that the secondary air can be supplied to the exhaust gas purifying catalyst downstream from a position where the secondary air passage is connected. Therefore, the oxygen in quantity enough to suppress generation of a catalyst exhaust gas odor can be occluded in the exhaust gas purifying catalyst on the downstream side. Furthermore, no secondary air is supplied to the exhaust gas purifying catalyst upstream from the position where the secondary air passage is connected, thereby suppressing the degradation of the exhaust gas purifying catalyst on the upstream side.

In the second air-fuel ratio control apparatus of the second aspect according to the present invention, the valve controlling means may set the supplying period to be shorter as a fuel cutting period by the fuel cutting means after the completion of the fuel quantity increasing operation is longer. The exhaust gas containing oxygen at substantially the same concentration as that of the air is supplied to the plurality of exhaust gas purifying catalysts during the fuel cutting period. Therefore, the same effect as that produced when the air is supplied to the plurality of exhaust gas purifying catalysts can be produced during the fuel cutting period. The supplying period, during which the secondary air is supplied, can be further shortened as the fuel cutting period is longer. In this manner, the period, during which the atmosphere of the exhaust gas purifying catalyst on the downstream side becomes lean, can be shortened by shortening the supplying period, thus suppressing the degradation.

BRIEF DESCRIPTION OF THE DRAWINGS

FIG. 14 is a flowchart showing a modification of the catalyst degradation suppressing control routine shown in FIG. 2;

DETAILED DESCRIPTION OF THE PREFERRED EMBODIMENTS

First Embodiment

Figure 1:
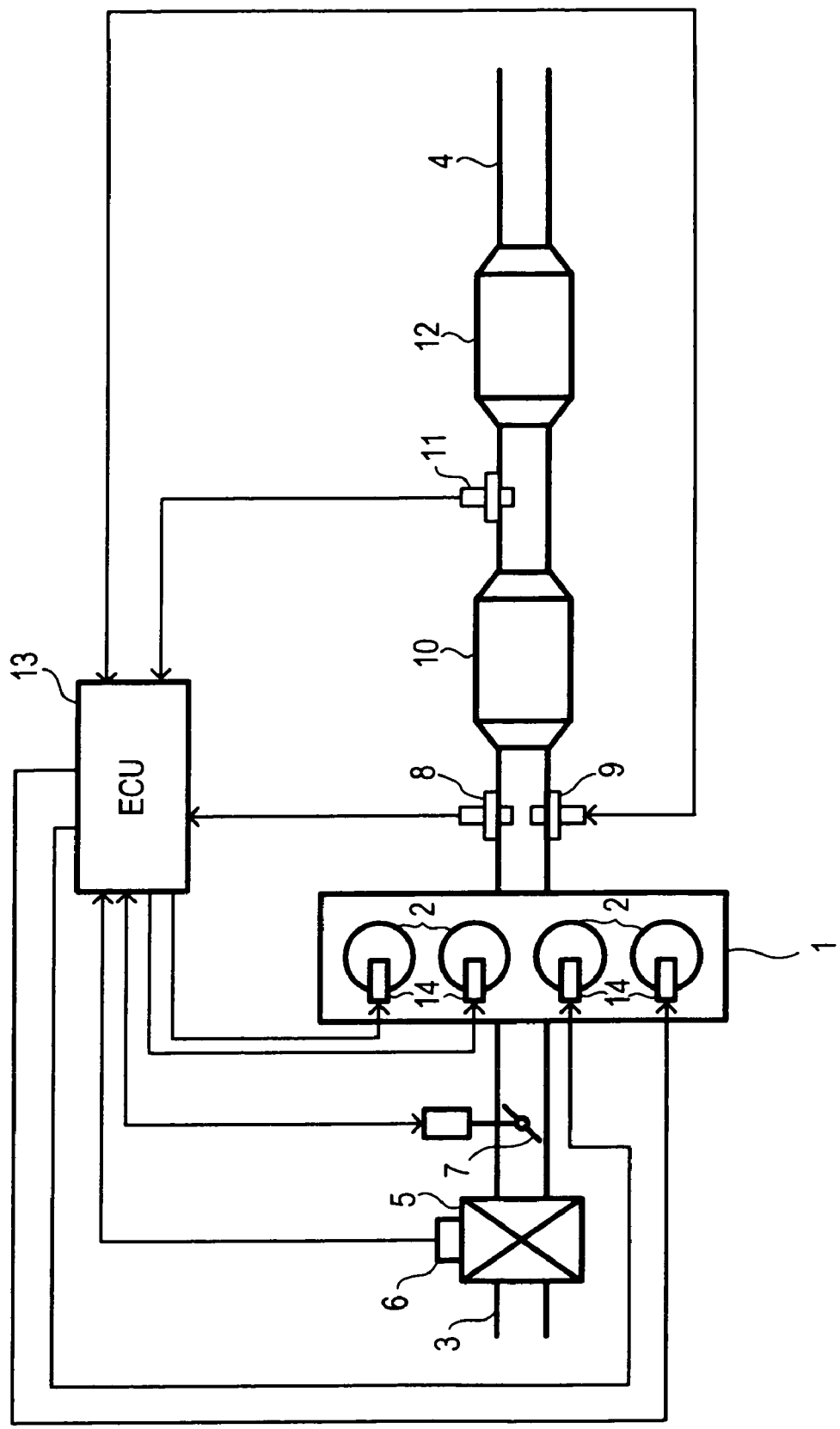
FIG. 1 is a diagram showing an internal combustion engine, to which an air-fuel ratio control apparatus according to the present invention is applied, in the first embodiment.

FIG. 1 is a diagram showing an internal combustion engine, to which an air-fuel ratio controller according to the present invention is applied, in the first embodiment. An internal combustion engine 1 is provided with cylinders 2 (four in FIG. 1). As well known, to the internal combustion engine 1 are connected an intake passage 3 and an exhaust passage 4. In the intake passage 3, there are provided an air filter 5 for filtrating intake air, an air flow sensor 6 for outputting a signal according to an intake air quantity, and a throttle valve 7 for adjusting the intake air quantity. In the exhaust passage 4, there are provided an air-fuel ratio sensor 8 for outputting a signal according to an air-fuel ratio of exhaust gas which is exhausted from the internal combustion engine 1, an exhaust gas temperature sensor 9 for outputting a signal according to a temperature of the exhaust gas, a start catalyst 10, an oxygen concentration sensor (hereinafter simply referred to as "an $O_2$ sensor") 11 for outputting a signal according to an oxygen concentration in the exhaust gas, and a three way catalyst 12 serving as an exhaust gas purifying catalyst. The start catalyst 10 is provided for the purpose of reduction of an exhaust quantity of hazardous substance until the three way catalyst 12 is activated at the time of cold start of the internal combustion engine 1, and thus the start catalyst 10 also serves as an exhaust gas purifying catalyst. As the start catalyst 10, for example, a three way catalyst is used. These catalysts 10 and 12 can occlude oxygen therein. When carbon monoxide (CO) or hydrocarbon (HC) is present in the exhaust gas, CO or HC is oxidized by using the occluded oxygen, thereby purifying the exhaust gas. Otherwise, when an oxide component such as $NO_x$ is contained in the exhaust gas, the oxide component is reduced, thereby purifying the exhaust gas.

The operating state of the internal combustion engine 1 is controlled by an engine control unit (hereinafter abbreviated as an "ECU") 13. The ECU 13 is configured as a computer including a microprocessor and peripheral devices such as a ROM and a RAM required for operation of the microprocessor in combination. The ECU 13 controls operation of a fuel injection valve 14 disposed for each of the cylinders 2 with reference to an output from, for example, the air-fuel ratio sensor 8 and the $O_2$ sensor 11, and further, supplies a proper quantity of fuel to each of the cylinders 2 such that the air-fuel ratio of the exhaust gas becomes a target air-fuel ratio. In this manner, the ECU 13 functions as air-fuel ratio controlling means by controlling the operation of the fuel injection valve 14. Furthermore, the ECU 13 cuts the fuel to be supplied to the internal combustion engine 1 for the purpose of reduction or the like of fuel consumption when an engine speed of the internal combustion engine 1 is a predetermined engine speed (for example, 1,000 rpm) or higher at the time of deceleration of the internal combustion engine 1. Hereinafter, such fuel cut operation may be abbreviated as a "F/C". In this manner, the ECU 13 also functions as fuel cutting means by cutting the fuel to be supplied to the internal combustion engine 1.

Figure 2:
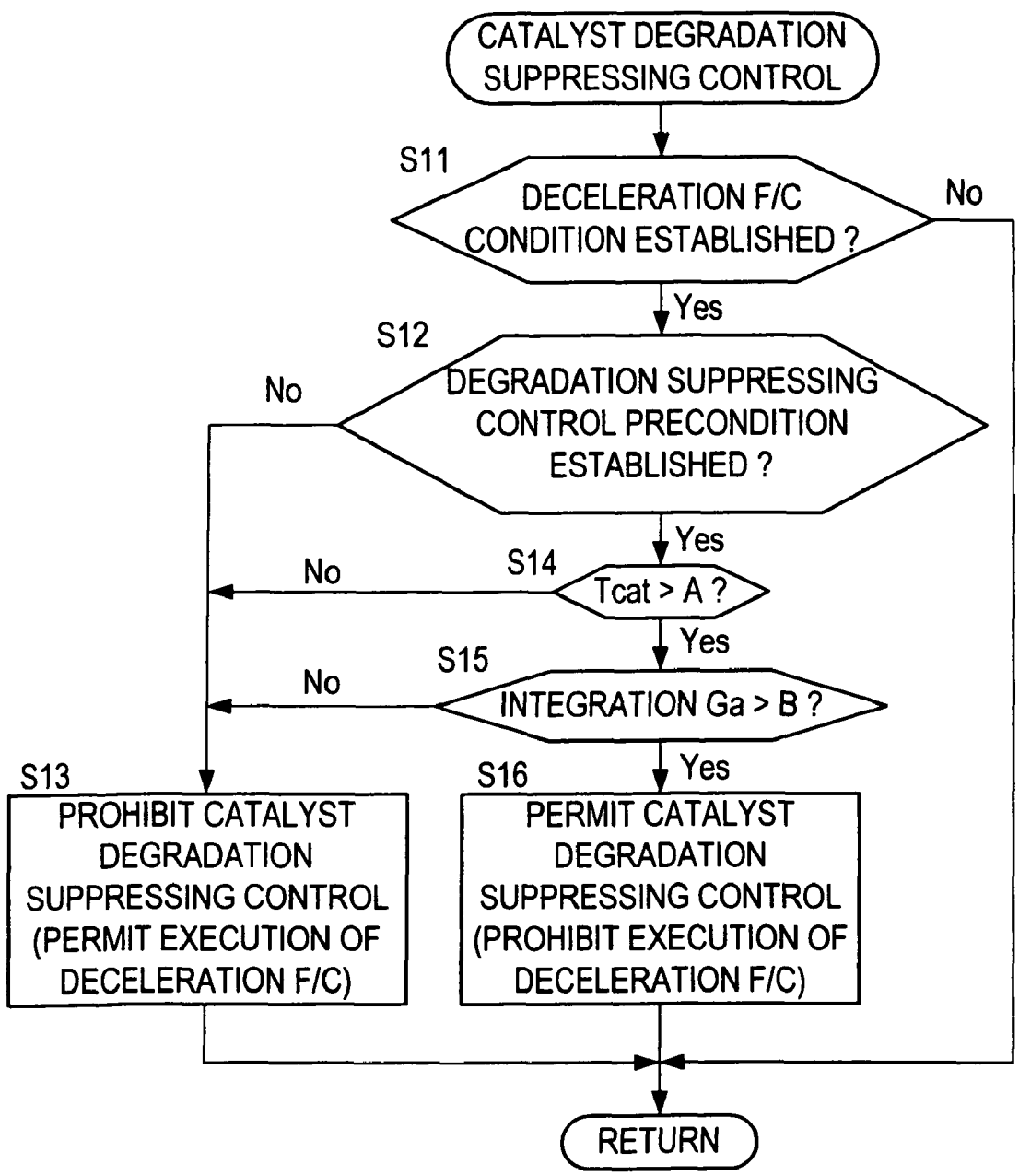
FIG. 2 is a flowchart showing a catalyst degradation suppressing control routine executed by an ECU shown in FIG. 1.

The degradation of each of the catalysts 10 and 12 advances if a catalyst temperature is high and oxygen is excessively contained in the exhaust gas by the F/C or the like. In view of this, the ECU 13 executes a catalyst degradation suppressing control routine shown in FIG. 2, and then, prohibits the F/C so as to suppress the degradation of the catalyst 10 or 12 if it is determined that the degradation of the catalyst 10 or 12 advances. The control routine shown in FIG. 2 is executed repeatedly in a predetermined cycle during the operation of the internal combustion engine 1. The ECU 13 serves as catalyst degradation suppressing means by executing the control routine shown in FIG. 2.

In the control routine shown in FIG. 2, the ECU 13 first determines in step S11 whether an F/C condition at the time of the deceleration of the internal combustion engine 1 is established. If it is determined that F/C condition is not established, the current control routine is ended. In contrast, if it is determined that the F/C condition is established, the control routine is proceeded to step S12, where the ECU 13 determines whether a precondition for execution of a degradation suppressing control for the catalyst 10 or 12 is established. It is determined that the precondition for the degradation suppressing control is established when, for example, the throttle valve 7 is normal, i.e. the throttle valve 7 has not been failed in its operation. In contrast, if it is determined that no precondition for the degradation suppressing control is established, the control routine is proceeded to step S13, where the ECU 13 prohibits the catalyst degradation suppressing control, that is, permits the execution of the deceleration F/C. Thereafter, the current control routine is ended.

In contrast, if it is determined that precondition for the degradation suppressing control is established, the control routine is proceeded to step S14, where the ECU 13 determines whether the temperature (Tcat) of the catalyst 10 or 12 exceeds a predetermined determination temperature A (for example, 800° C.), where the degradation of the catalyst advances. The temperature of the catalysts 10 and 12 can be estimated by referring to, for example, an output from the exhaust gas temperature sensor 9. If it is determined that the temperature (Tcat) of the catalyst 10 or 12 does not exceed the predetermined determination temperature A, the control routine is proceeded to step S13, where the ECU 13 prohibits the catalyst degradation suppressing control, and thereafter, ends the current control routine. In contrast, if determined that the temperature (Tcat) of the catalyst 10 or 12 exceeds the predetermined determination temperature A, the control routine is proceeded to step S15, at which it is determined whether an integration value (i.e., an integration Ga) of an intake air quantity (Ga) taken into the internal combustion engine 1 after the fuel quantity increasing operation of the internal combustion engine 1 exceeds a predetermined quantity b. For example, an integration value of Ga, where oxygen in quantity enough to suppress generation of $H_2S$ can be occluded in the catalyst 10 or 12, is set as the predetermined quantity b. The integration Ga is calculated by integrating Ga acquired based on an output from the air flow sensor 6 according to a control routine different from that shown in FIG. 2. When determined that the integration Ga is the predetermined quantity b or smaller, the control routine is proceeded to step S13, where the ECU 13 prohibits the catalyst degradation suppressing control, and thereafter, ends the current control routine. In contrast, if it is determined that the integration Ga is greater than the predetermined quantity b, the control routine is proceeded to step S16, where the ECU 13 permits the catalyst degradation suppressing control, that is, prohibits the execution of the F/C. Thereafter, the ECU 13 ends the current control routine.

In the above-described manner, a period (i.e., an operation permitting period), during which the execution of the deceleration F/C is permitted, is set until the integration Ga reaches the predetermined quantity b after the fuel quantity increasing operation of the internal combustion engine 1 by executing the control routine shown in FIG. 2, so that the oxygen in quantity enough to suppress the generation of $H_2S$ can be occluded in the catalyst 10 or 12. A completion timing of the operation permitting period may be determined based on a lapse of time after the fuel quantity increasing operation in addition to the integration Ga.

Figure 3:
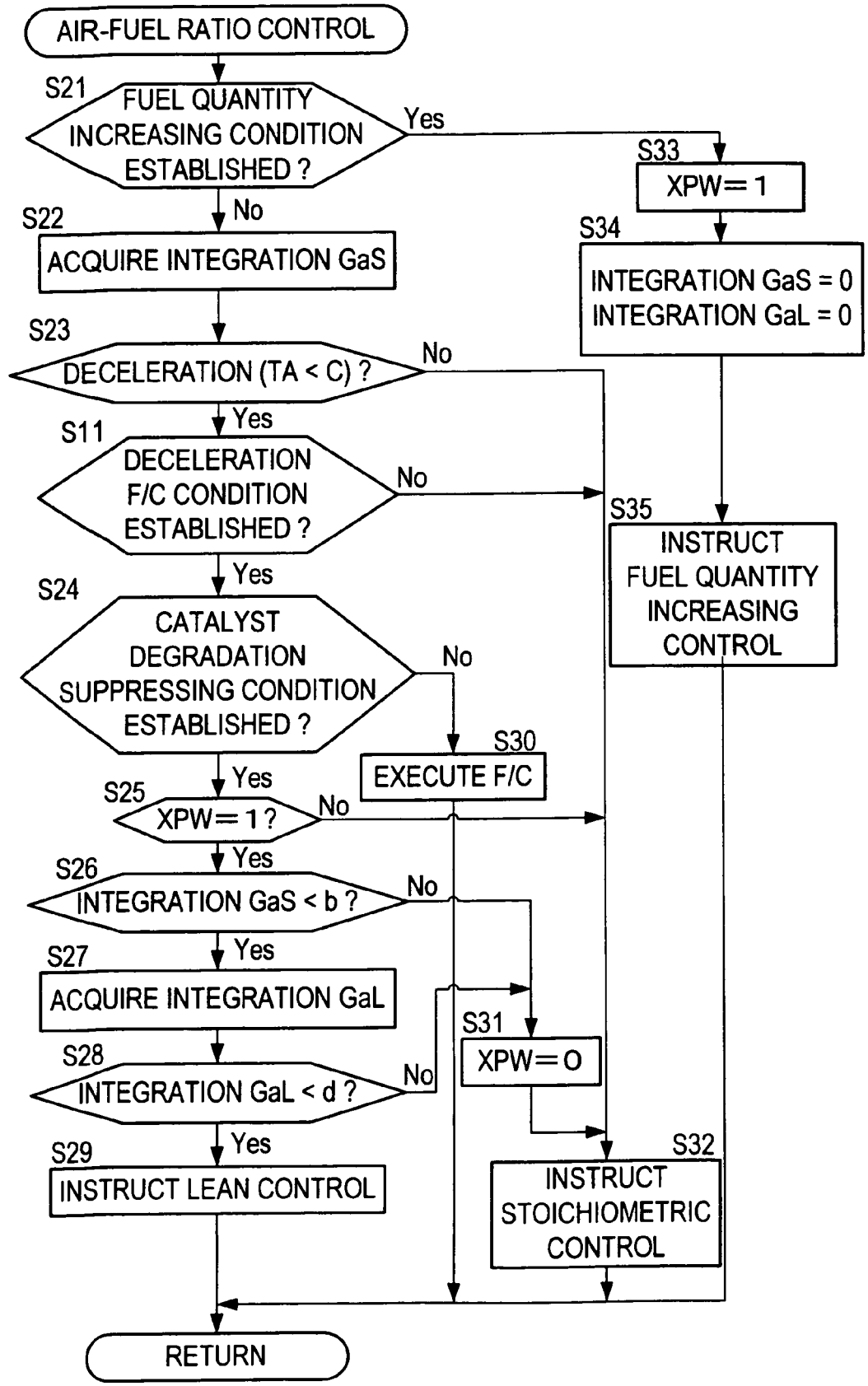
FIG. 3 is a flowchart showing the first example of an air-fuel ratio control routine executed by the ECU shown in FIG. 1.

FIG. 3 is a flowchart showing the first example of an air-fuel ratio control routine executed by the ECU 13 for controlling the air-fuel ratio. The control routine shown in FIG. 3 is executed repeatedly in a predetermined cycle during the operation of the internal combustion engine 1. Here, the same processing in FIG. 3 as that in FIG. 2 is designated by the same reference numeral, and therefore, its explanation will be omitted.

In the air-fuel ratio control routine shown in FIG. 3, the ECU 13 first determines in step S21 whether a fuel quantity increasing condition, under which fuel to be supplied to the internal combustion engine 1 is increased, is established. The fuel quantity increasing condition is established when, for example, output enhancement is required for the internal combustion engine 1. If it is determined that the fuel quantity increasing condition is not established, the control routine is proceeded to step S22, where the ECU 13 acquires the integration value (i.e., the integration GaS) of the quantity of intake air taken into the internal combustion engine 1 during a stoichiometric operation, in which the air-fuel ratio is controlled to be a stoichiometric air-fuel ratio, after the fuel quantity increasing operation of the internal combustion engine 1. The integration GaS can be acquired by integrating outputs from the air flow sensor 6 after, for example, the internal combustion engine 1 transits from the fuel quantity increasing operation to the stoichiometric operation.

In next step S23, it is determined whether the internal combustion engine 1 is in a deceleration state. It is determined whether the internal combustion engine 1 is in a deceleration state, for example, based on whether an opening degree (TA) of the throttle valve 7 is smaller than a predetermined opening degree C. Here, an opening degree slightly greater than an opening degree during an idle operation of the internal combustion engine 1, for example, is set as the predetermined opening degree C. If it is determined that the internal combustion engine 1 is in a deceleration state, the control routine is proceeded to step S11, where the ECU 13 determines whether the deceleration F/C condition is established. If it is determined that the deceleration F/C condition is established, the control routine is proceeded to step S24, where the ECU 13 determines whether a catalyst degradation suppressing condition is established. Here, it is determined that the catalyst degradation suppressing condition is established when, for example, the throttle valve 7 is normal and the temperature Tcat is higher than the predetermined temperature A. If it is determined that the catalyst degradation suppressing condition is established, the control routine is proceeded to step S25, where the ECU 13 determines whether a flag XPW, for determining whether the fuel quantity increasing operation has been carried out in the internal combustion engine 1, is 1 which indicates that the fuel quantity increasing operation has been carried out. If it is determined that the flag XPW is 1, the control routine is proceeded to step S26, where it is determined whether the integration GaS is less than the predetermined quantity b. If it is determined that the integration GaS is less than the predetermined quantity b, the control routine is proceeded to step S27, where the integration value of the Ga (i.e., an integration GaL) during operation in the lean air-fuel ratio in the internal combustion engine 1 after a fuel quantity increasing operation is acquired. The integration GaL can be acquired by integrating the Ga during, for example, the operation in the lean air-fuel ratio of the internal combustion engine 1.

In next step S28, the ECU 13 determines whether the integration GaL is less than a predetermined quantity d. For example, an integrating air intake quantity during the lean operation of the internal combustion engine 1, by which the oxygen in quantity enough to suppress the generation of $H_2S$ can be occluded in the exhaust gas purifying catalyst 10, is set as the predetermined quantity d. If it is determined that the integration GaL is less than the predetermined quantity d, the control routine is proceeded to step S29, where the ECU 13 instructs a lean control to set the lean air-fuel ratio in the internal combustion engine 1. Thereafter, the current control routine is ended.

If it is determined in step S24 that the catalyst degradation suppressing condition is not established, the control routine is proceeded to step S30, where the ECU 13 executes the F/C. Thereafter, the current control routine is ended. If it is determined in step S26 that the integration GaS is not less than the predetermined quantity b or it is determined in step S28 that the integration GaL is not less than a predetermined quantity d, the control routine is proceeded to step S31, where the ECU 13 substitutes 0 into XPW. In next step S32, the ECU 13 instructs the stoichiometric control for controlling the air-fuel ratio in the internal combustion engine 1 to be the stoichiometric air-fuel ratio. Thereafter, the current control routine is ended. When determined in step S23 that the internal combustion engine 1 is not in a deceleration state, determined in step S11 that the deceleration F/C condition is not established, or determined in step S25 that the XPW is not 1, the control routine is proceeded to step S32, where the ECU 13 instructs the internal combustion engine 1 to perform the stoichiometric control. Thereafter, the current control routine is ended. If it is determined in step S21 that the fuel quantity increasing operation condition of the internal combustion engine 1 is established, the control routine is proceeded to step S33, where the ECU 13 substitutes 1 into XPW. In next step S34, the ECU 13 initializes the integrations GaS and GaL by substituting 0 into them. In next step S35, the ECU 13 instructs the fuel quantity increasing control so as to increase a quantity of fuel to be supplied to the internal combustion engine 1. Thereafter, the current control routine is ended.

In this manner, the lean control is instructed only when the internal combustion engine 1 is in a deceleration state and the catalyst degradation suppressing condition is established in the air-fuel ratio control routine shown in FIG. 3, thereby suppressing the degradation of each of the catalysts 10 and 12. Furthermore, a period during which the lean control is instructed (i.e., the lean control period) is ended by substituting 0 into the XPW when the integration GaL or GaS becomes the predetermined quantity or more, and thereafter, the operation is performed at the stoichiometric air-fuel ratio, thereby further suppressing the degradation of each of the catalysts 10 and 12. Here, the completion timing of the lean control period may be determined by utilizing a period during which the internal combustion engine 1 is operated at the lean air-fuel ratio after the quantity increasing operation in place of the integration GaL, and a period during which the internal combustion engine 1 is operated at the stoichiometric air-fuel ratio after the quantity increasing operation in place of the integration GaS.

Figure 4:
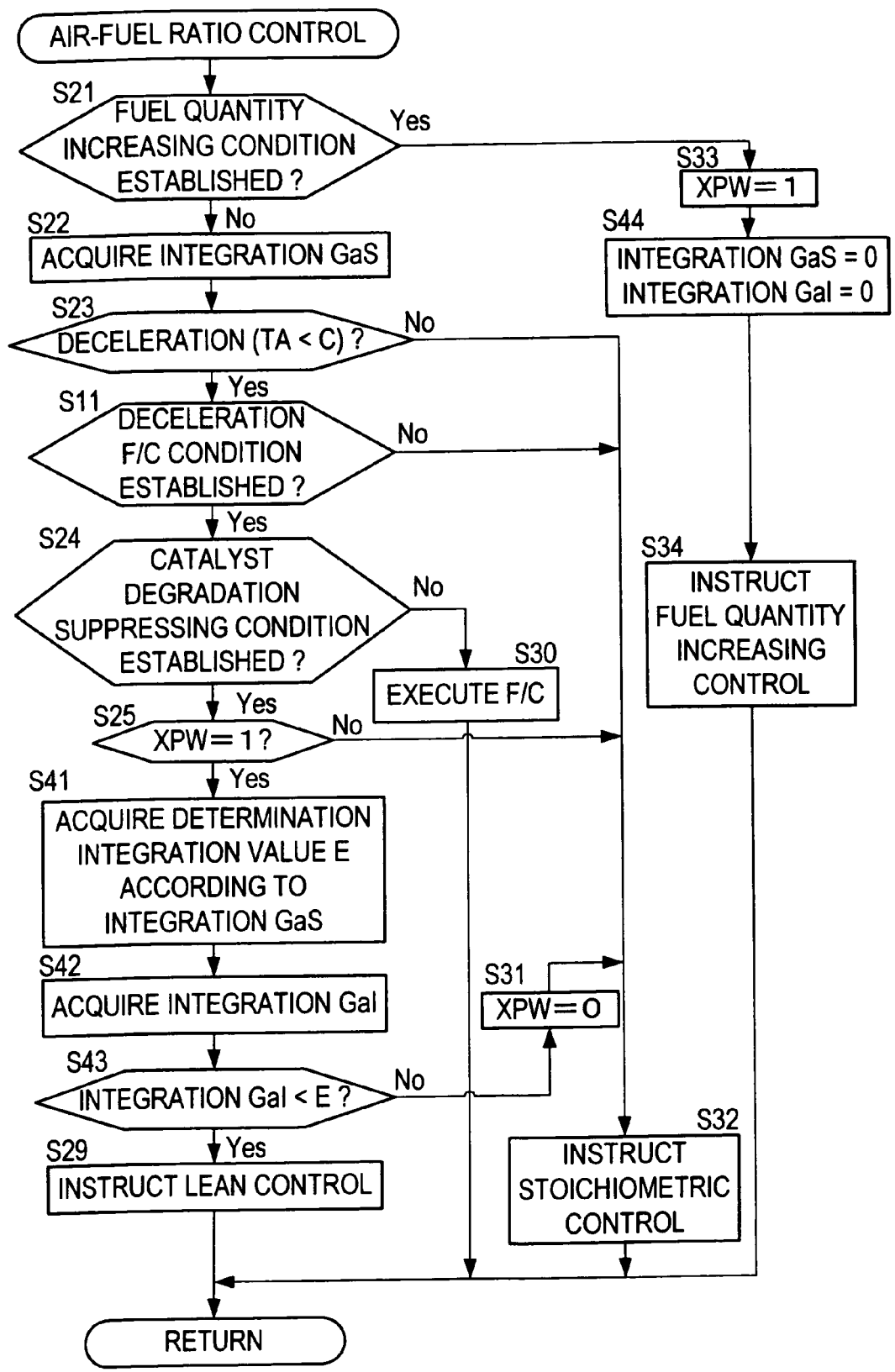
FIG. 4 is a flowchart showing the second example of an air-fuel ratio control routine executed by the ECU shown in FIG. 1.

FIG. 4 is a flowchart showing the second example of an air-fuel ratio control routine executed by the ECU 13. The air-fuel ratio control routine shown in FIG. 4 is different from the control routine shown in FIG. 3 in that a period, during which an air-fuel ratio in the internal combustion engine 1 is controlled to be a lean air-fuel ratio, is changed according to the integration GaS. The control routine shown in FIG. 4 is executed repeatedly in a predetermined cycle during operation of the internal combustion engine 1. Here, the same processing in FIG. 4 as that in FIG. 3 is designated by the same reference numeral, and therefore, its explanation will be omitted.

In the air-fuel ratio control routine shown in FIG. 4, the ECU 13 first determines in step S21 whether a fuel quantity increasing condition of the internal combustion engine 1 is established. If it is determined that the fuel quantity increasing condition is not established, the control routine is proceeded to step S22, where the ECU 13 acquires an integration GaS. In next step S23, the ECU 13 determines whether the internal combustion engine 1 is in a deceleration state. If it is determined that the internal combustion engine 1 is in a deceleration state, the control routine is proceeded to step S11, where the ECU 13 determines whether a deceleration F/C condition of the internal combustion engine 1 is established. If it is determined that the deceleration F/C condition is established, the control routine is proceeded to step S24, where the ECU 13 determines whether a catalyst degradation suppressing condition is established. Here, if it is determined that the catalyst degradation suppressing condition is established, the control routine is proceeded to step S25, where the ECU 13 determines whether the flag XPW is 1.

Figure 5:
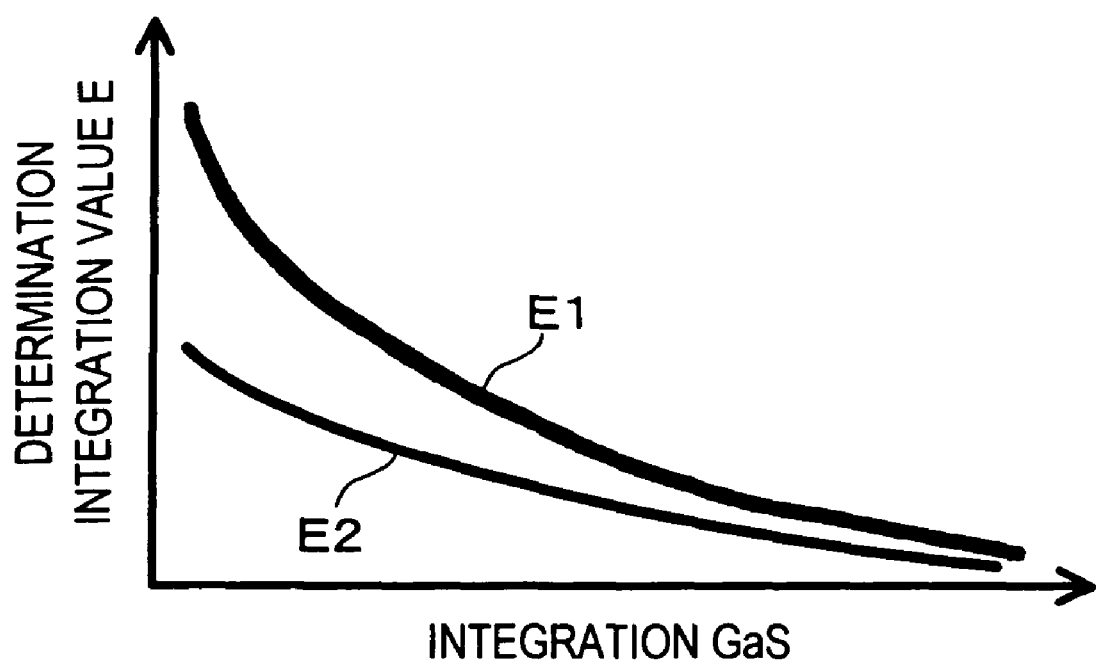
FIG. 5 is a graph showing one example of the relationship between an integration GaS and a determination integration value E.

If it is determined that the flag XPW is 1, the control routine is proceeded to step S41, where a determination integration value E for determining the completion of a lean control period in the internal combustion engine 1 according to the integration GaS is acquired. The determination integration value E can be acquired by, for example, referring to a curve E1 in a map shown in FIG. 5. Since oxygen is contained in the exhaust gas during a stoichiometric operation of the internal combustion engine 1, the oxygen is gradually occluded in catalysts 10 and 12 also during the stoichiometric operation. As a consequence, for example, when the integration GaS is great (that is, the stoichiometric operation period in the internal combustion engine 1 is long), the oxygen in quantity enough to suppress generation of $H_2S$ can be occluded in the catalysts 10 and 12 even if the lean control period during the deceleration of the internal combustion engine 1 becomes short.

In next step S42, an integration GaI serving as an integration value of Ga taken into the internal combustion engine 1 after the air-fuel ratio in the internal combustion engine 1 is controlled to be a lean air-fuel ratio is acquired. The integration GaI can be acquired, for example, by integrating the Ga during the operation at the lean air-fuel ratio in the internal combustion engine 1 after the fuel quantity increasing operation. In next step S43, the ECU 13 determines whether the integration GaI is less than the determination integration value E. If it is determined that the integration GaI is less than the determination integration value E, the control routine is proceeded to step S29, where the ECU 13 instructs the internal combustion engine 1 to perform a lean control. Thereafter, the current control routine is ended.

If it is determined in step S24 that the catalyst degradation suppressing condition is not established, the control routine is proceeded to step S30, where the ECU 13 executes the F/C. Thereafter, the current control routine is ended. If it is determined in step S43 that the integration GaI is not less than the determination integration value E, the control routine is proceeded to step S31, where the ECU 13 substitutes 0 into the XPW. In next step S33, the ECU 13 instructs the internal combustion engine 1 to perform a stoichiometric control. Thereafter, the current control routine is ended. When determined in step S23 that the internal combustion engine 1 is not in a deceleration state, determined in step S11 that the deceleration F/C condition is not established, or determined in step S25 that the XPW is not 1, the control routine is proceeded to step S32. Thereafter, the same processing as that shown in FIG. 4 is performed, and then, the current control routine is ended.

If it is determined in step S21 that the fuel quantity increasing operation condition in the internal combustion engine 1 is established, the control routine is proceeded to step S33, where the ECU 13 substitutes 1 into the XPW. In next step S44, the ECU 13 initializes the integrations GaS and GaI by substituting 0 into them. In next step S35, the ECU 13 instructs the internal combustion engine 1 to perform the fuel quantity increasing operation. Thereafter, the current control routine is ended.

As described above, in the control routine shown in FIG. 4, the determination integration value E is adjusted according to the integration GaS, so that the lean control period is properly adjusted. If the integration GaS is great, the determination integration value E is reduced, and further, the lean control period is shortened. Therefore, it is possible to suppress the degradation of each of the catalysts 10 and 12. In contrast, if the integration GaS is small, the determination integration value E is increased, and further, the lean control period is prolonged. The lean control period is prolonged in this manner, so that the oxygen in quantity enough to suppress the generation of $H_2S$ can be occluded in the catalyst 10 or 12.

Figure 6:
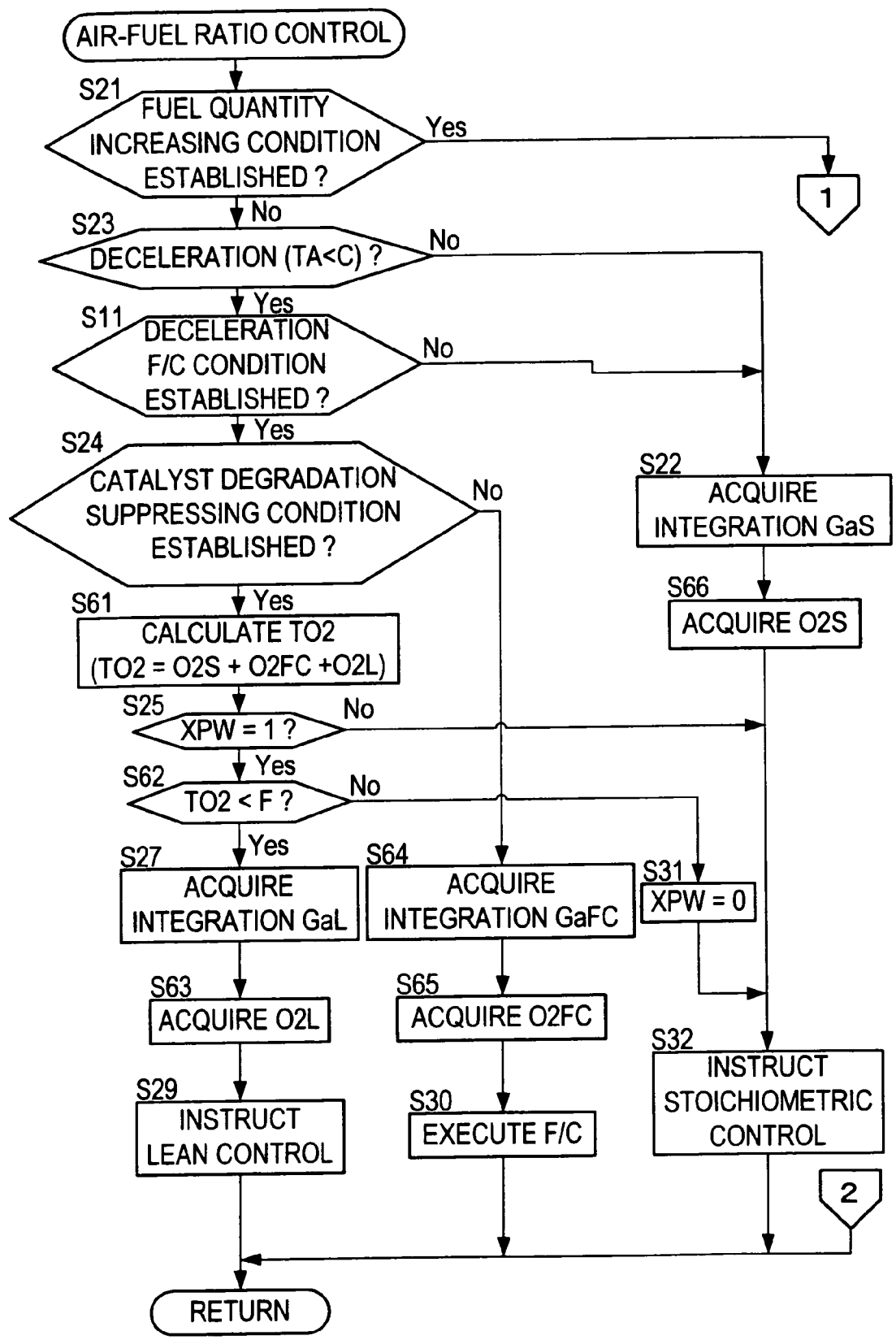
FIG. 6 is a flowchart showing the third example of an air-fuel ratio control routine executed by the ECU shown in FIG. 1.
Figure 7:
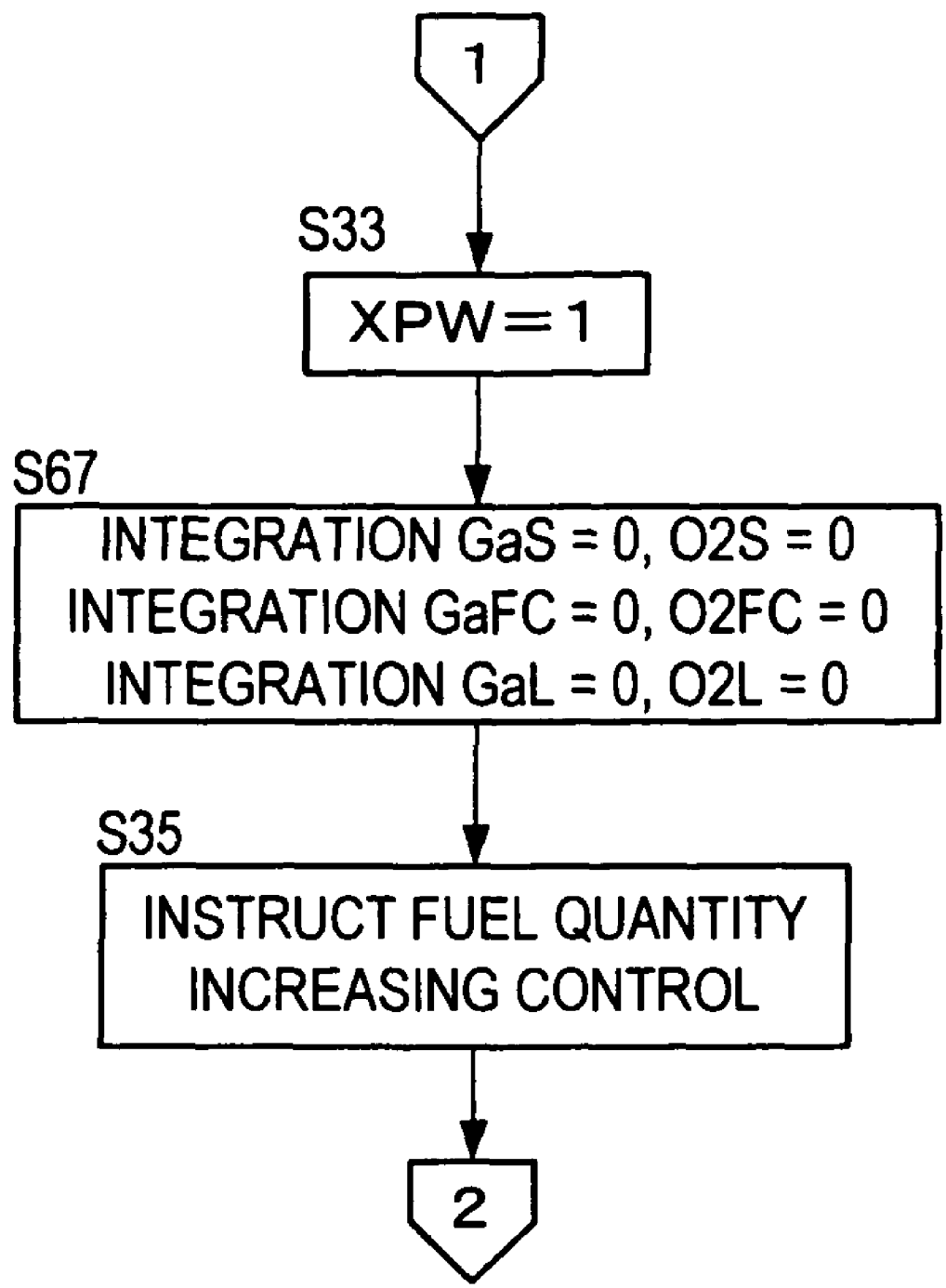
FIG. 7 is a flowchart following FIG. 6.

FIGS. 6 and 7 are flowcharts showing the third example of an air-fuel ratio control routine executed by the ECU 13. The air-fuel ratio control routine shown in FIG. 6 is different from the air-fuel ratio control routine in the other examples in that an integration flow rate of oxygen flowing into catalysts 10 and 12 after a fuel quantity increasing operation is estimated based on Ga, and thus, that a lean control period is changed according to the integration flow rate of the flowing oxygen. The control routine shown in FIG. 6 is executed repeatedly in a predetermined cycle during operation of the internal combustion engine 1. Here, the same processing in FIGS. 6 and 7 as that in FIGS. 3 and 4 is designated by the same reference numeral, and therefore, its explanation will be omitted.

In the control routine shown in FIG. 6, the ECU 13 first determines in step S21 whether a fuel quantity increasing condition in the internal combustion engine 1 is established. If it is determined that the fuel quantity increasing condition is not established, the control routine is proceeded to step S23, where the ECU 13 determines whether the internal combustion engine 1 is in a deceleration state. If it is determined that the internal combustion engine 1 is in a deceleration state, the control routine is proceeded to step S11, where the ECU 13 determines whether a deceleration F/C condition of the internal combustion engine 1 is established. If it is determined that the deceleration F/C condition is established, the control routine is proceeded to step S24, where the ECU 13 determines whether a catalyst degradation suppressing condition is established. Here, if it is determined that the catalyst degradation suppressing condition is established, the control routine is proceeded to step S61, where a total value (TO2) of the integration flow rate of oxygen flowing into the catalysts 10 and 12 after the fuel quantity increasing operation is calculated. The TO2 is obtained by summing an integration flow rate (O2L) of oxygen flowing into the catalysts 10 and 12 during a lean operation of the internal combustion engine 1 acquired in step S63, an integration flow rate (O2FC) of oxygen flowing into the catalysts 10 and 12 during the F/C, acquired in step S65, and an integration flow rate (O2S) of oxygen flowing into the catalysts 10 and 12 during a stoichiometric operation of the internal combustion engine 1 acquired in step S66. The values O2S, O2FC, and O2L are stored in a RAM in the ECU 13, and the previous values are held until new values are substituted therein.

Figure 8:
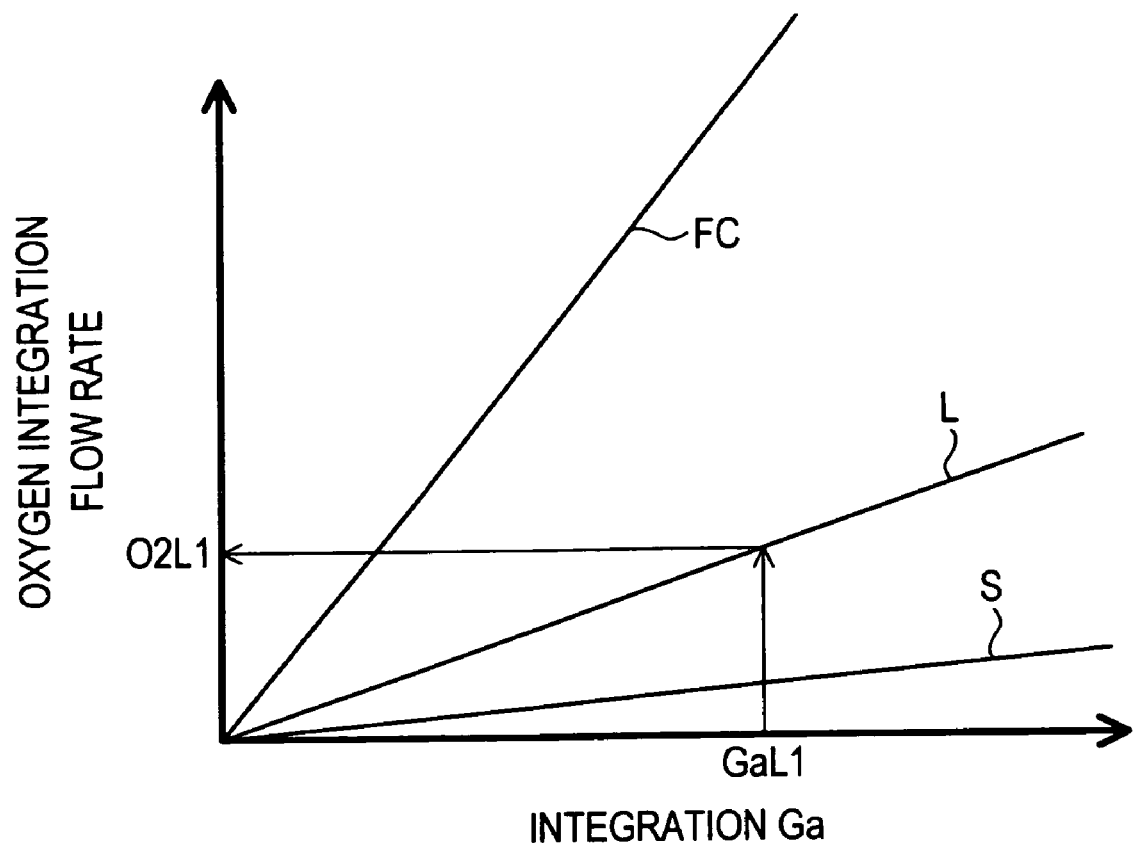
FIG. 8 is a graph showing one example of the relationship between an integration Ga and an oxygen integration flow rate.

In next step S25, the ECU 13 determines whether a flag XPW is 1. If it is determined that the XPW is 1, the control routine is proceeded to step S62, where the ECU 13 determines whether the TO2 is less than a determination oxygen quantity F. As the determination oxygen quantity F, for example, an oxygen quantity enough to suppress generation of $H_2S$ is set. If it is determined that the TO2 is less than the determination oxygen quantity F, the control routine is proceeded to step S27, where the ECU 13 acquires the integration GaL. In next step S63, the ECU 13 acquires the O2L based on the integration GaL. The flow rate of oxygen flowing into the catalysts 10 and 12 can be estimated based on the Ga. Thus, the integration flow rate of oxygen flowing into the catalysts 10 and 12 is estimated based on the integration Ga by using a map shown in FIG. 8. Since the quantity of fuel to be supplied to the internal combustion engine 1 varies according to whether the internal combustion engine 1 is operated under which state of the lean air-fuel ratio, the F/C, or the stoichiometric air-fuel ratio, the concentration of oxygen in the exhaust gas from the internal combustion engine 1 is varied according to the operation state of the internal combustion engine 1. In view of this, in order to acquire the integration flow rate of oxygen according to the operation state, lines corresponding to the integrations Ga in the respective operation states are shown in the map shown in FIG. 8. When the O2L is acquired based on the integration GaL, a line L shown in FIG. 8 is used. For example, when the integration GaL is GaL1 shown in FIG. 8, the value O2L becomes O2L1 shown in FIG. 8. The ECU 13 functions as oxygen integration flow rate acquiring means by executing the above-described processing. In subsequent step S29, the ECU 13 instructs the internal combustion engine 1 to perform the lean control. Thereafter, the current control routine is ended.

If it is determined in step S24 that the catalyst degradation suppressing condition is not established, the control routine is proceeded to step S64, where the ECU 13 acquires an integration GaFC as an integration value of Ga at the time of the F/C. The integration GaFC is calculated by, for example, integrating the Ga acquired from the air flow sensor 6 at the time of the F/C. In subsequent step S65, the ECU 13 acquires an O2FC based on the integration GaFC with reference to FIG. 8. When acquiring the O2FC, a line FC shown in FIG. 8 is used. In next step S30, the ECU 13 executes the F/C. Thereafter, the current control routine is ended.

When determined in step S23 that the internal combustion engine 1 is not in the deceleration state, the control routine is proceeded to step S22, where the ECU 13 acquires the integration GaS. In next step S66, the ECU 13 acquires an O2S based on the integration GaS referring to the map shown in FIG. 8. When acquiring the O2S, a line S shown in FIG. 8 is used. In next step S32, the ECU 13 instructs the internal combustion engine 1 to perform the stoichiometric control. Thereafter, the current control routine is ended. If it is determined in step S62 that the TO2 is not less than the determination oxygen quantity F, the control routine is proceeded to step S31, where the ECU 13 substitutes 0 into the XPW. At subsequent step S32, the ECU 13 instructs the internal combustion engine to perform a stoichiometric control. Thereafter, the current control routine is ended.

If it is determined in step S21 that the fuel quantity increasing operation condition is established, the control routine is proceeded to step S33 shown in FIG. 7, where the ECU 13 substitutes 1 into the XPW. In next step S67, the ECU 13 substitutes 0 into the integrations GaS, GaFC, GaL, O2S, O2L and O2FC, and thus, initializes these values. In next step S35, the ECU 13 instructs the internal combustion engine 1 to perform the fuel quantity increasing control. Thereafter, the current control routine is ended.

As described above, the completion of the period, during which the air-fuel ratio in the internal combustion engine 1 is controlled to be a lean air-fuel ratio, is determined based on the TO2 containing the O2FC in the control routine shown in FIG. 6. As a consequence, for example, when the F/C is executed for a long period after, the fuel quantity increasing operation, the O2FC becomes great, and thus, the lean control period becomes shorter. In contrast, the O2FC becomes small when the F/C is executed for a short period, and thus, the lean control period becomes longer. Since the concentration of the oxygen contained in the exhaust gas during the F/C becomes substantially the same as that of the air, a great quantity of oxygen can be occluded in the catalysts 10 and 12. However, when the fuel cutting period is short, there is a possibility that the oxygen in quantity enough to suppress the generation of $H_2S$ cannot be occluded in the catalyst 10 or 12. Thus, only in such a case, the air-fuel ratio in the internal combustion engine 1 is controlled to be a lean air-fuel ratio, so that the oxygen in quantity enough to suppress the generation of $H_2S$ is occluded in the catalyst 10 or 12.

Figure 9:
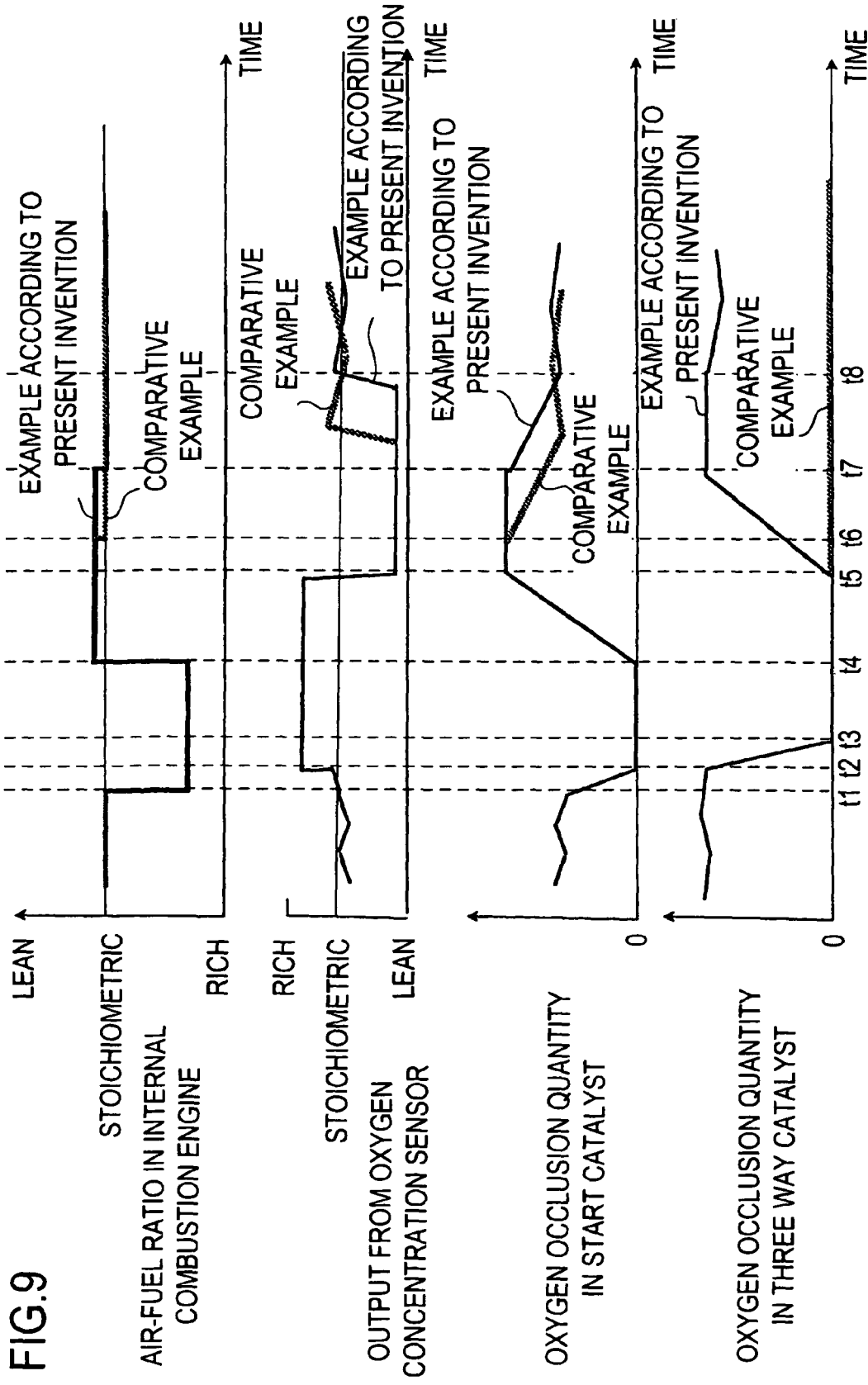
FIG. 9 is a timing chart showing one example of changes in time of oxygen occlusion quantities in catalysts and an output of an oxygen concentration sensor when the control routine shown in FIG. 6 is executed.

FIG. 9 is a timing chart showing one example of changes in time of the oxygen occlusion quantity in the catalysts 10 and 12 and an output from the oxygen concentration sensor 11 in the case where the air-fuel ratio control routine shown in FIG. 6 is executed. Comparative examples are also shown in FIG. 9, in which a time change is shown in the case where an air-fuel ratio is made lean only for a certain period after a fuel quantity increasing operation. When an increase in fuel quantity is instructed to the internal combustion engine 1 at a timing t1 in FIG. 9, the air-fuel ratio in the internal combustion engine 1 becomes rich. Consequently, the air-fuel ratio of the exhaust gas becomes rich, and first, the oxygen occlusion quantity in the start catalyst 10 is started to be decreased. When the oxygen occlusion quantity in the start catalyst 10 becomes 0 at a timing t2 in FIG. 9, the output from the oxygen concentration sensor 11 is changed onto a rich side, and thus, the rich exhaust gas is started to flow into the three way catalyst 12. Therefore, the oxygen occlusion quantity in the three way catalyst 12 is started to be decreased. Thereafter, the oxygen occlusion quantity in the three way catalyst 12 becomes 0 at a timing t3.

Since the air-fuel ratio in the internal combustion engine 1 is controlled to be a lean air-fuel ratio upon completion of the fuel quantity increasing operation at a timing t4 in FIG. 9, oxygen occlusion is first started in the start catalyst 10. Upon completion of the oxygen occlusion in the start catalyst 10 up to a maximum oxygen occlusion quantity at a timing t5, the oxygen occlusion is started in the three way catalyst 12. According to the present invention, thereafter, the air-fuel ratio in the internal combustion engine 1 is controlled to be a lean air-fuel ratio till a timing t7, so that the oxygen is occluded in the three way catalyst 12. In contrast, when the air-fuel ratio is controlled to be a lean air-fuel ratio only for a certain period after the fuel quantity increasing operation, the air-fuel ratio in the internal combustion engine 1 is controlled to be a lean air-fuel ratio only till a timing t6, so that the oxygen can be sufficiently occluded in the start catalyst 10 but little oxygen can be occluded in the three way catalyst 12. In this manner, the oxygen can be sufficiently occluded in the catalysts 10 and 12 by executing the control routine shown in FIG. 6, thus suppressing the generation of $H_2S$ after the stoppage of the internal combustion engine 1.

Second Embodiment

An air-fuel ratio control apparatus in the second embodiment according to the present invention will be described below with reference to FIGS. 10 and 11. Here, the same members in FIG. 10 as those in FIG. 1 are designated by the same reference numerals, and therefore, the explanation thereof will be omitted.

Figure 10:
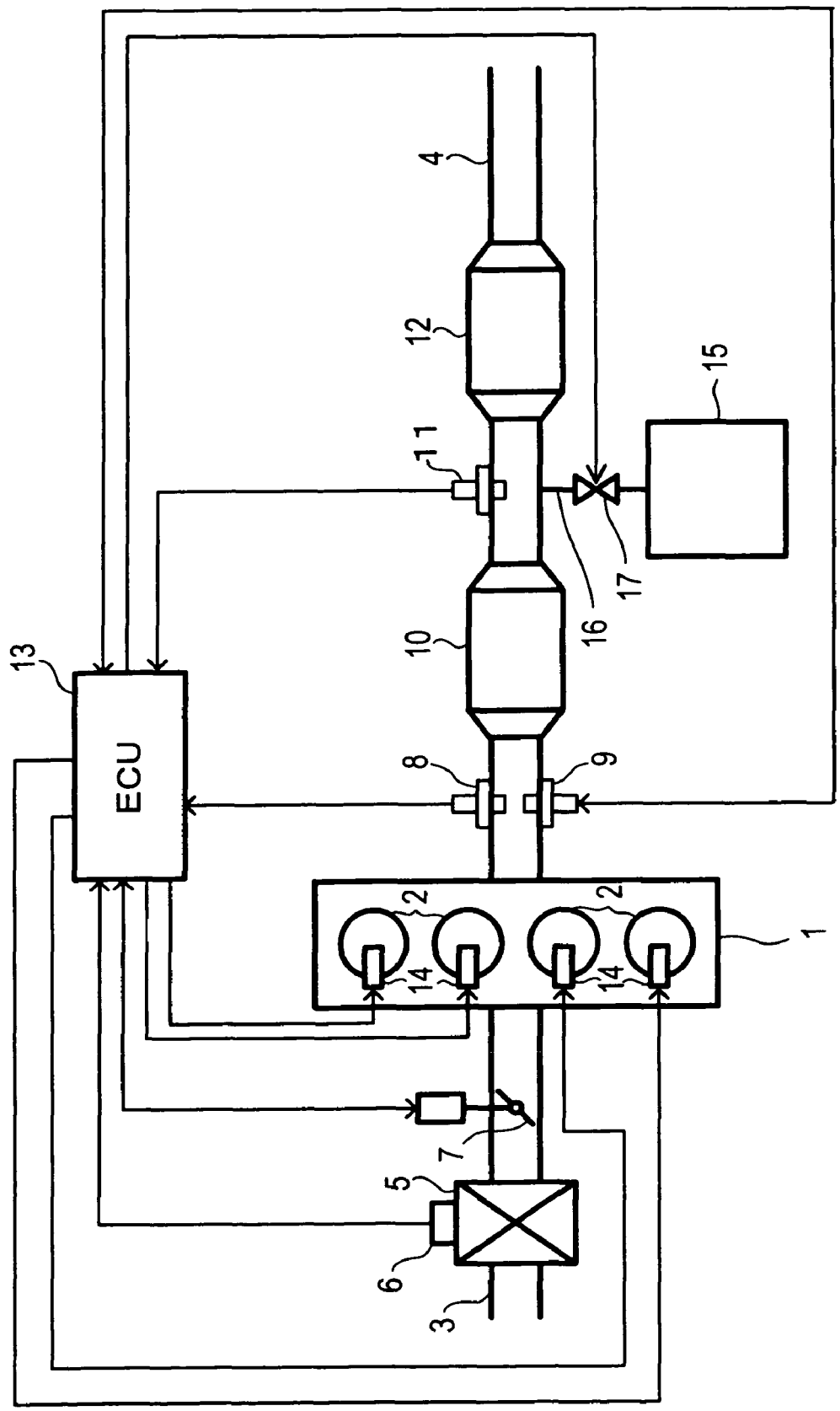
FIG. 10 is a diagram showing an internal combustion engine, to which the air-fuel ratio control apparatus according to the present invention is applied, in the second embodiment.

The second embodiment shown in FIG. 10 is different from the first embodiment in that there is provided a secondary air supplier 15 serving as secondary air supplying means for supplying secondary air, and the secondary air supplier 15 and the exhaust passage 4 are connected each other via a secondary air passage 16 at a portion between the start catalyst 10 and the three way catalyst 12. In the secondary air passage 16 is disposed a supply valve 17 serving as valve means for switching the connection to or disconnection from the secondary air passage 16 by opening and closing so as to supply the secondary air to the exhaust passage 4. In other words, the supply valve 17 is capable of switching the connection state of the secondary air passage 16, and the secondary air can be supplied to the exhaust passage 4 by making the supply valve 17 open. Here, the secondary air supplier 15 supplies the secondary air to the exhaust passage 4 via, for example, an air pump or an air suction.

The ECU 13 controls the operation of the supply valve 17. FIG. 11 is a flowchart showing a secondary air supply control routine to be executed by the ECU 13 in order to supply the secondary air to the exhaust passage 4. The control routine shown in FIG. 11 is executed repeatedly in a predetermined cycle during the operation of the internal combustion engine. Here, the same processing in FIG. 11 as that in FIG. 3 is designated by the same reference numeral, and therefore, its explanation will be omitted. The ECU 13 functions as valve control means by executing the control routine shown in FIG. 11.

Figure 11:
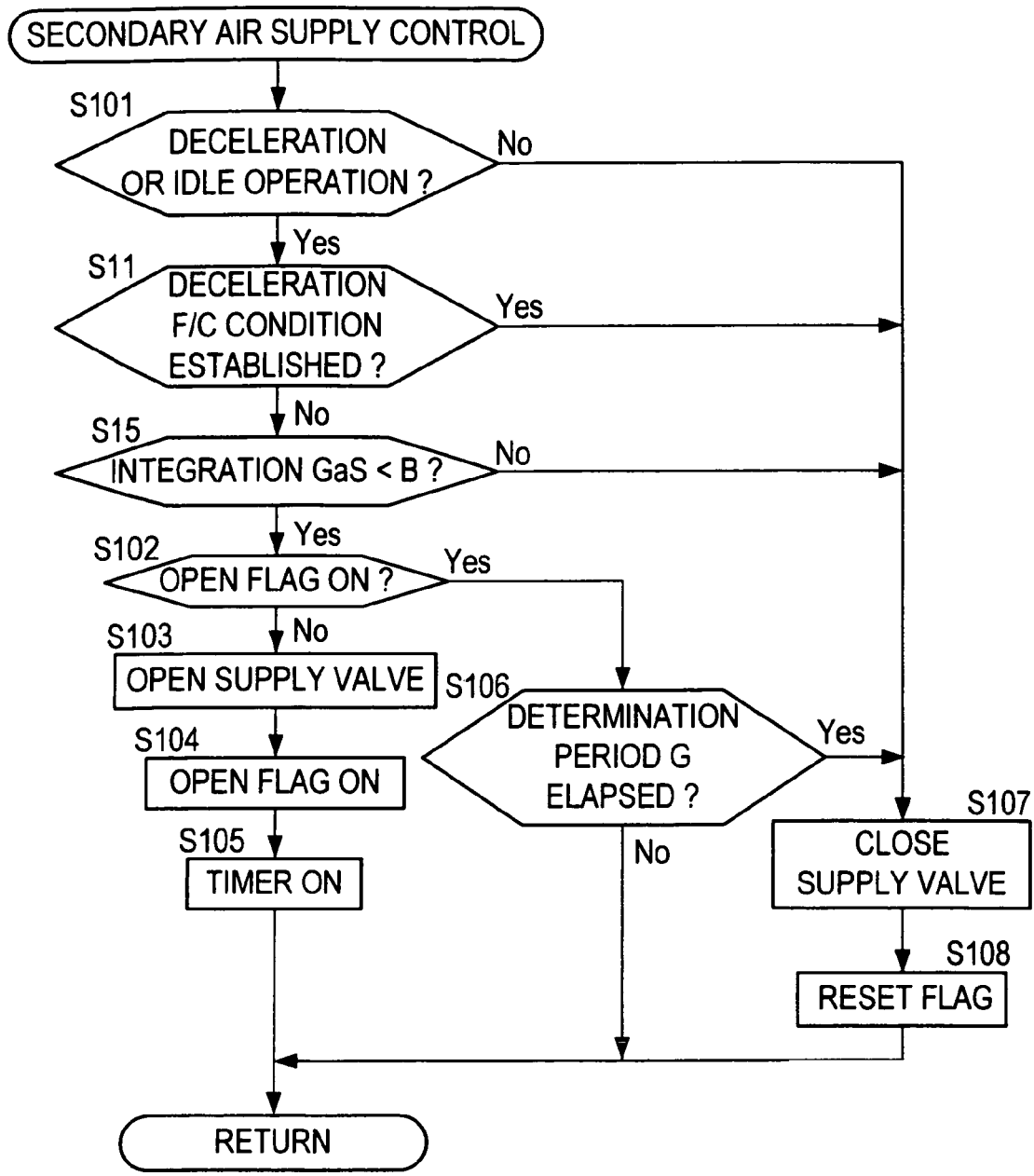
FIG. 11 is a flowchart showing a supplying valve control routine executed by an ECU shown in FIG. 10.

In the secondary air supply control routine shown in FIG. 11, the ECU 13 first determines in step S101 whether the internal combustion engine 1 is in the deceleration state or an idle operation state. The operation state of the internal combustion engine 1 can be estimated by referring to, for example, the opening degree of the throttle valve 7. If it is determined that the internal combustion engine 1 is in the deceleration state or the idle operation state, the control routine is proceeded to step S11, where the ECU 13 determines whether the deceleration F/C condition is established. If it is determined that the deceleration F/C condition is not established, the control routine is proceeded to step S15, where the ECU 13 determines whether an integration GaS is less than a predetermined quantity B. If it is determined that the integration GaS is less than the predetermined quantity B, the control routine is proceeded to step S102, where the ECU 13 determines whether an open flag indicating an open state of the supply valve 17 is ON. If it is determined that the open flag is not ON, the control routine is proceeded to step S103, where the ECU 13 opens the supply valve 17 so as to start supplying the secondary air. In next step S104, the ECU 13 turns ON the open flag. In subsequent step S105, the ECU 13 starts to actuate a timer. This timer is used to determine whether a predetermined period of time is elapsed after the supply valve 17 is opened. Thereafter, the current control routine is ended.

In contrast, if it is determined in step S102 that the open flag is ON, the control routine is proceeded to step S106, where the ECU 13 determines whether a predetermined determination period G of time is elapsed after the timer is started to be actuated. Here, as the determination period G, for example, a period during which oxygen in quantity enough to suppress generation of $H_2S$ can be occluded in the three way catalyst 12 by the supply of the secondary air is set. If it is determined that the determination period G is not elapsed, the current control routine is ended. In contrast, if it is determined that the determination period G is elapsed, the control routine is proceeded to step S107, where the supply of the secondary air is stopped by closing the supply valve 17. In next step S108, the ECU 13 resets the flag, and thereafter, the current control routine is ended. Also if the determination result is negative in step S101, the determination result is affirmative in step S11, or the determination result is negative in step S15, the control routine is proceeded to step S107, where the ECU 13 closes the supply valve 17. Subsequently, the flag is reset in step S108, and thereafter, the current control routine is ended.

Since the control routine shown in FIG. 11 is executed in the above-described manner, the secondary air is supplied to the catalyst 12 for the predetermined supply period of time (that is, a period until the determination period G is elapsed) if no deceleration F/C is executed, so that the oxygen in quantity enough to suppress the generation of $H_2S$ can be occluded in the catalyst 12. Moreover, the secondary air is supplied downstream from the start catalyst 10, thereby suppressing the degradation of the start catalyst 10.

Figure 12:
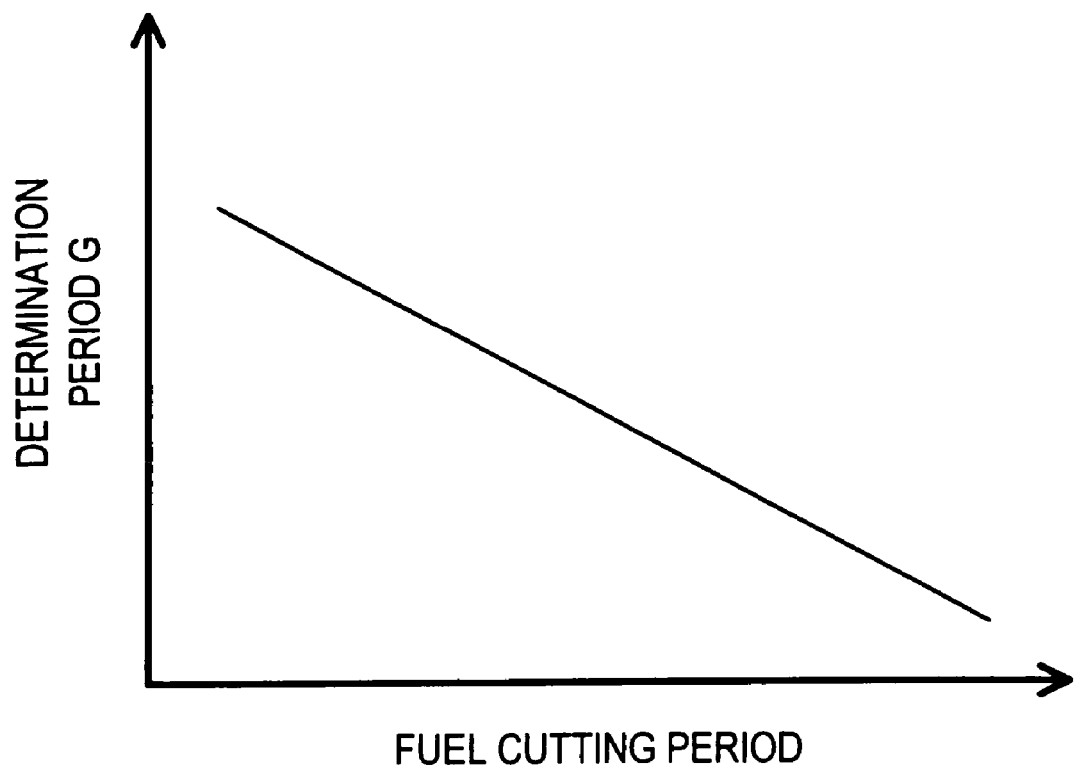
FIG. 12 is a graph showing one example of the relationship between a fuel cutting period and a determination period G.

The determination period G may be changed according to a period during which the F/C is executed at the time of the deceleration after the fuel quantity increasing operation (that is, a fuel cutting period). When the fuel cutting period is long, it is considered that the oxygen in quantity enough to suppress the generation of $H_2S$ can be occluded in the three way catalyst 12 by supplying a small quantity of secondary air. Therefore, the determination period G used in step S106 shown in FIG. 11 may be set with reference to, for example, a map shown in FIG. 12. FIG. 12 shows one example of the relationship between the fuel cutting period and the determination period G. In FIG. 12, the longer the fuel cutting period, the shorter the determination period.

In the above-described manner, the oxygen in quantity enough to suppress the generation of $H_2S$ can be occluded in the three way catalyst 12 by changing the determination period G according to the fuel cutting period, and further, the degradation of the three way catalyst 12 can be suppressed by properly adjusting the quantity of secondary air to be supplied to the three way catalyst 12.

Figure 13A:
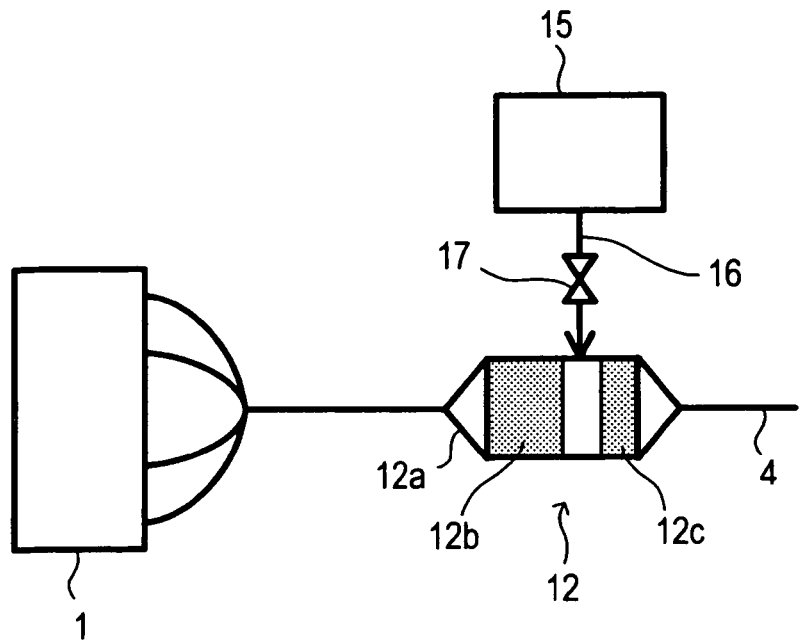
FIGS. 13A and 13B are diagrams showing modifications of the second embodiment according to the present invention.
Figure 13B:
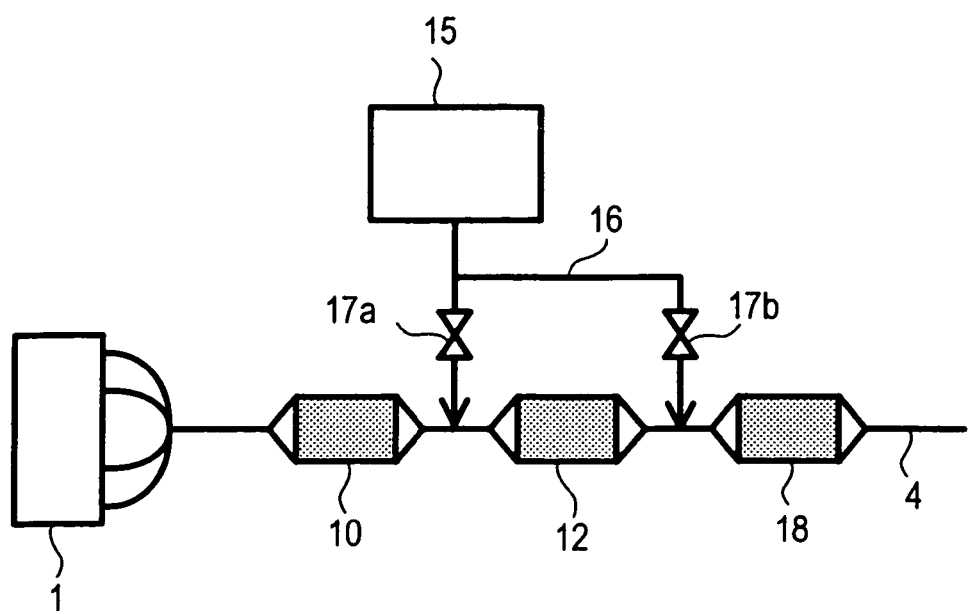

The second embodiment can be applied to the internal combustion engine having a plurality of catalysts disposed in the exhaust passage. As shown in, for example, FIG. 13A, when the three way catalyst 12 is divided into two catalysts 12b and 12c inside a casing 12a in arrangement, the casing 12a and the secondary air supplier 15 are connected to each other in such a manner as to supply the secondary air to a portion between the two catalysts 12b and 12c, thus producing a similar effect. Otherwise, as shown in FIG. 13B, when three catalysts are disposed in the exhaust passage 4 by additionally disposing an exhaust gas purifying catalyst 18 downstream from the catalyst 12, the secondary air supplier 15 is connected between the respective two catalysts, thus producing a similar effect. Here, when the three catalysts are disposed in the exhaust passage 4 in the above-described manner, the secondary air passage 16 may be connected both between the catalysts 10 and 12 and between the catalysts 12 and 18, or the secondary air passage 16 may be connected either between the catalysts 10 and 12 or between the catalysts 12 and 18. Also in an internal combustion engine having four or more catalysts disposed in the exhaust passage, a similar effect can be produced by disposing the secondary air passage 16 on at least one portion between the catalysts.

Figure 15:
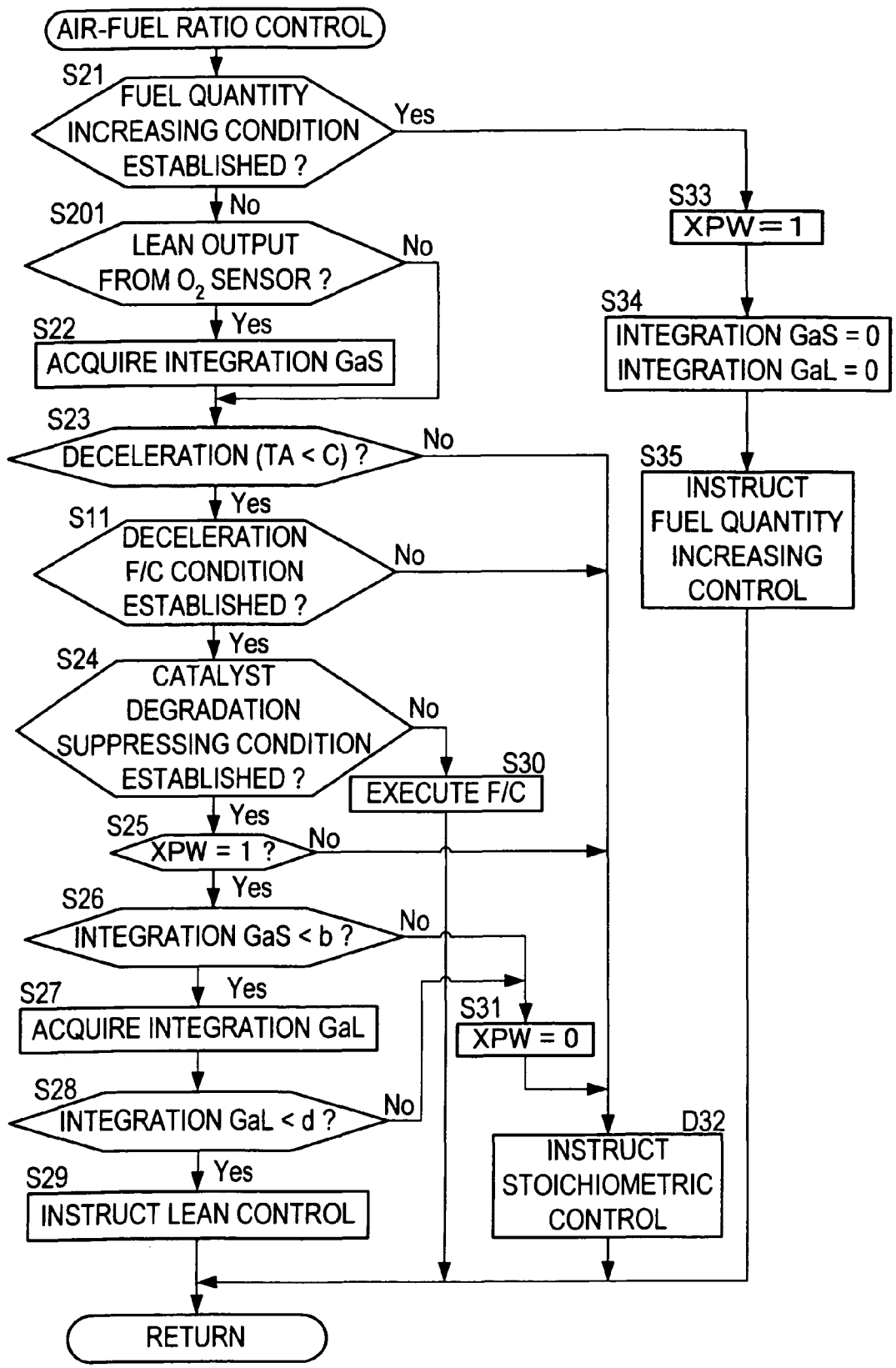
FIG. 15 is a flowchart showing a modification of the air-fuel ratio control routine shown in FIG. 3.
Figure 16:
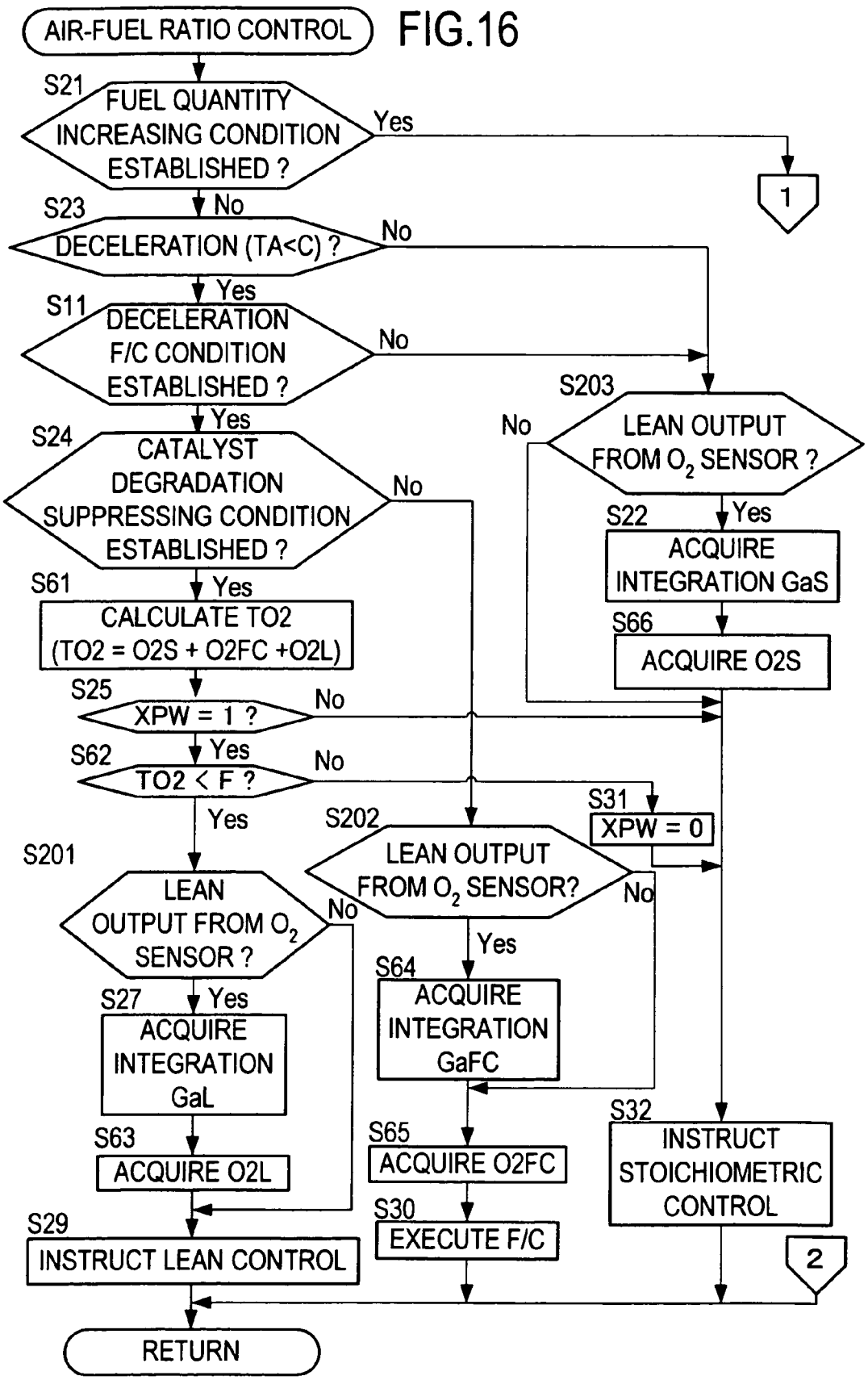
FIG. 16 is a flowchart showing a modification of the air-fuel ratio control routine shown in FIG. 6.

The present invention is not limited to the above-described embodiments, but may be embodied in various modes. For example, the integration starting timing of the integration Ga used in the control routine according to the present invention is not limited to the timing after the completion of the fuel quantity increasing operation, but the integration may be started after the $O_2$ sensor 11 outputs a signal on a lean side. FIGS. 14 to 16 show a control routine for determining the integration starting timing by the $O_2$ sensor 11 in the above-described manner.

FIG. 14 is a flowchart showing a modification of the catalyst degradation suppressing control routine shown in FIG. 2. The control routine shown in FIG. 14 is also executed repeatedly in a predetermined cycle during the operation of the internal combustion engine 1. Here, the same processing in FIG. 14 as that in FIG. 2 is designated by the same reference numeral, and therefore, its explanation will be omitted.

In the control routine shown in FIG. 14, the ECU 13 performs the same processing as that shown in FIG. 2 until the ECU 13 determines whether the temperature Tcat exceeds the determination temperature A (till step S14). If it is determined that the temperature Tcat exceeds the determination temperature A, the control routine is proceeded to step S201, where the ECU 13 determines whether a signal output from the $O_2$ sensor 11 is changed onto a lean side after the fuel quantity increasing operation of the internal combustion engine 1. If it is determined that the signal is not changed onto the lean side, the control routine is proceeded to step S13, where the ECU 13 prohibits the catalyst degradation suppressing control, and then, the current control routine is ended. In contrast, if it is determined that the signal is changed onto the lean side, the control routine is proceeded to step S15, where the same processing as that shown in FIG. 2 is performed, and then, the current control routine is ended.

In this manner, according to the control routine shown in FIG. 14, it is determined whether the integration Ga exceeds the predetermined quantity b after the signal output from the $O_2$ sensor 11 is changed onto the lean side in step S201, that is, after the air-fuel ratio of the exhaust gas flowing into the catalyst 12 is changed to the lean air-fuel ratio. Consequently, the completion timing of the operation permitting period is determined by using the integration value of the intake air quantity taken into the internal combustion engine 1 after the signal output from the $O_2$ sensor 11 is changed onto the lean side. The completion timing of the operation permitting period in the control routine shown in FIG. 3 may be determined based on the lapse of time after the signal output from the $O_2$ sensor 11 is changed onto the lean side in addition to the integration Ga.

FIG. 15 is a flowchart showing a modification of the air-fuel ratio control routine shown in FIG. 3. The control routine shown in FIG. 15 is also executed repeatedly in a predetermined cycle during the operation of the internal combustion engine 1. Here, the same processing in FIG. 15 as that in FIGS. 4 and 14 is designated by the same reference numeral, and therefore, its explanation will be omitted.

In the control routine shown in FIG. 15, the ECU 13 performs the same processing as that shown in FIG. 3 until the ECU 13 determines whether the fuel quantity increasing condition is established (till step S21). If it is determined that the fuel quantity increasing condition is established, the control routine is proceeded to step S201, where the ECU 13 determines whether a signal output from the $O_2$ sensor 11 is changed onto a lean side after the fuel quantity increasing operation. If it is determined that the signal is changed onto the lean side, the control routine is proceeded to step S22, where the ECU 13 acquires the integration GaS. After the same processing as that shown in FIG. 3 is performed, the current control routine is ended. In contrast, if it is determined that the signal is not changed onto the lean side, the control routine is proceeded to step S23. After the same processing as that shown in FIG. 3 is performed, the current control routine is ended.

In this manner, according to the control routine shown in FIG. 15, the integration GaS is acquired after the signal output from the $O_2$ sensor 11 is changed onto the lean side. Consequently, the completion timing of the lean control period is determined based on the integration GaS after the oxygen is started to be supplied to the catalyst 12, and therefore it can be more accurately determined whether the oxygen in quantity enough to suppress the generation of $H_2S$ can be occluded in the catalyst 12. The completion timing of the lean control period in the control routine shown in FIG. 15 may be determined based on the lapse of time after the signal output from the $O_2$ sensor 11 is changed onto the lean side in addition to the integration Ga.

FIG. 16 is a flowchart showing a modification of the air-fuel ratio control routine shown in FIG. 6. The control routine shown in FIG. 16 is also executed repeatedly in a predetermined cycle during the operation of the internal combustion engine 1. Here, the same processing in FIG. 16 as that in FIGS. 6 and 14 is designated by the same reference numeral, and therefore, its explanation will be omitted.

The control routine shown in FIG. 16 is different from that shown in FIG. 6 in thin step S201 is executed if the ECU 13 determines that the result is affirmative in step S62, step S202 is executed if the ECU 13 determines that the result is negative in step S24, and step S203 is executed if the ECU 13 determines that the result is negative in step S23 or step S11. In step S201, the ECU 13 determines whether the signal output from the $O_2$ sensor 11 is changed onto a lean side after the fuel quantity increasing operation. If it is determined that the signal is changed onto the lean side, the control routine is proceeded to step S27, and in contrast, if it is determined that the signal is not changed onto the lean side, the control routine is proceeded to step S29. Also in steps S202 and S203, the ECU 13 determines whether the signal output from the $O_2$ sensor 11 is changed onto the lean side after the fuel quantity increasing operation. If the ECU 13 determines that the result is affirmative in step S202, the control routine is proceeded to step S64, and in contrast, if the ECU 13 determines that the result is negative, the control routine is proceeded to step S30. If the ECU 13 determines that the result is affirmative in step S203, the control routine is proceeded to step S22, and in contrast, if the ECU 13 determines that the result is negative, the control routine is proceeded to step S32.

In this manner, the quantity of oxygen flowing into the catalyst 12 can be more accurately calculated by acquiring the integration Ga after the signal output from the $O_2$ sensor 11 is changed onto the lean side after the fuel quantity increasing operation. The completion timing of the lean control period in the control routine shown in FIG. 16 may also be determined based on the lapse of time after the signal output from the $O_2$ sensor 11 is changed onto the lean side in addition to the integration Ga in the same manner as that shown in FIG. 15.

Furthermore, the integration starting timing of the integration GaS in the control routine shown in FIG. 4 may also be started after the $O_2$ sensor 11 outputs the signal on the lean side. In this case, since the Ga of the period during which the oxygen is occluded in the catalyst 10 is not integrated, the integration GaS becomes small. Consequently, if the integration starting timing of the integration GaS in the control routine shown in FIG. 4 is set after the $O_2$ sensor 11 outputs the signal on the lean side, the determination integration value E is acquired by using a curve E2 in FIG. 5 in step S41.

As described above, in the control routines shown in FIGS. 14 to 16, after the signal output from the $O_2$ sensor 11 is changed onto the lean side, that is, after the air-fuel ratio of the exhaust gas flowing into the catalyst 12 is changed to the lean air-fuel ratio, the calculation of the integration Ga is started, and thus, the completion timing is determined based on the integration Ga. Thus, it can be more accurately determined whether the oxygen in quantity enough to suppress the generation of $H_2S$ can be occluded in the catalyst 12.

As is described above, according to the present invention, it is possible to suppress the generation of the catalyst exhaust gas odor, because the air-fuel ratio is controlled to be the lean air-fuel ratio according to the operation state at the time of the deceleration after the fuel quantity increasing operation of the internal combustion engine and the oxygen is occluded in the exhaust gas purifying catalyst. Additionally, the period, during which the air-fuel ratio is set to the lean air-fuel ratio, is properly adjusted, thus suppressing the degradation of the exhaust gas purifying catalyst.

What is claimed is:

1. An air-fuel ratio control apparatus of an internal combustion engine comprising:
    a plurality of exhaust gas purifying catalysts disposed in an exhaust gas purifying catalyst casing, the exhaust gas purifying catalyst casing disposed in an exhaust passage of the internal combustion engine;
    secondary air supplying means for supplying secondary air through a secondary air passage to at least one portion of the exhaust gas purifying catalyst casing, the portion of the exhaust gas purifying catalyst casing being disposed between the plurality of exhaust gas purifying catalysts;
    valve means for switching connection to or disconnection from the secondary air passage;
    valve controlling means for controlling operation of the valve means; and
    fuel cutting means for cutting fuel to be supplied to the internal combustion engine at the time of deceleration of the internal combustion engine, wherein
    the valve controlling means sets a supplying period, during which the secondary air is supplied by switching the valve means to a connection state during a non-operating period of the fuel cutting means after completion of a fuel quantity increasing operation of the internal combustion engine.

2. The air-fuel ratio control apparatus of the internal combustion engine according to claim 1, wherein the valve controlling means sets the supplying period to be shorter as a fuel cutting period by the fuel cutting means after the completion of the fuel quantity increasing operation is longer.

* * * * *